United States Patent [19]

Hashimoto

[11] Patent Number: 4,555,567

[45] Date of Patent: Nov. 26, 1985

[54] 2,6-DISAZO ANTHRAQUINONE COMPOUNDS

[75] Inventor: Mitsuru Hashimoto, Numazu, Japan

[73] Assignee: Ricoh Co., Ltd., Tokyo, Japan

[21] Appl. No.: 537,774

[22] Filed: Sep. 30, 1983

Related U.S. Application Data

[62] Division of Ser. No. 385,341, Jun. 4, 1982, Pat. No. 4,440,845.

[30] Foreign Application Priority Data

Jun. 8, 1981 [JP] Japan .................................. 56-87845
Jun. 8, 1981 [JP] Japan .................................. 56-87846

[51] Int. Cl.$^4$ ...................... C09B 33/02; C09B 35/02; C09B 56/12; G03G 5/06

[52] U.S. Cl. ...................................... 534/654; 430/58; 430/71; 430/72; 430/73; 430/75; 430/76; 430/79; 534/655; 534/563

[58] Field of Search ............... 260/160, 161, 165, 177, 260/178, 184, 188, 189; 534/653, 654, 655, 658

[56] References Cited

U.S. PATENT DOCUMENTS 4,242,260 12/1980 Sasaki et al. ........................ 260/160
4,349,616 9/1982 Sasaki .............................. 260/160 X

FOREIGN PATENT DOCUMENTS 2412076 9/1974 Fed. Rep. of Germany ...... 260/174
56-46237 4/1981 Japan ....................................... 160/
2076007 11/1981 United Kingdom ................ 260/178

*Primary Examiner*—Floyd D. Higel
*Attorney, Agent, or Firm*—Flynn, Thiel, Boutell & Tanis

[57] ABSTRACT

A disazo compound having the general formula (1)

(1)

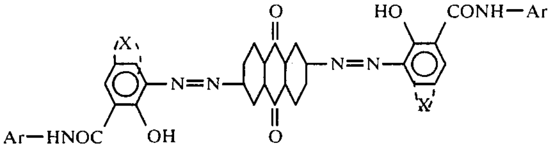

(wherein X represents a substituted or unsubstituted aromatic ring or hetero ring, and Ar represents a substituted or unsubstituted aromatic ring or hetero ring);

a method of making said disazo compound which comprises using, as a starting material, couplers having the general formula (2)

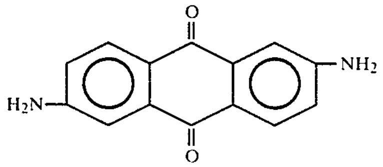

and the general formula (4)

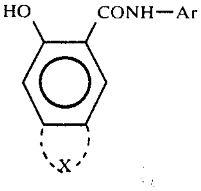

(wherein X and Ar are the same as defined above); and a multilayer type electrophotographic element using said disazo compound as a charge transfer substance.

18 Claims, 20 Drawing Figures

2,6-DISAZO ANTHRAQUINONE COMPOUNDS

This is a division of application Ser. No. 385,341 filed June 4, 1982 now U.S. Pat. No. 4,440,845.

BACKGROUND OF THE INVENTION (1) Field of The Invention

The present invention relates to a novel disazo compound, a method of making same and an electrophotographic element, in particular a multilayer type electrophotographic element which comprises a charge carrier generating layer containing a substance capable of generating charge carriers when exposed to radiation of light (which will be called a charge carrier generating substance hereinafter) and a charge transfer layer containing a substance capable of accepting charge carriers generated from said charge carrier generating layer and transferring them (which will be called a charge transfer layer hereinafter).

(2) Description of The Prior Art

As electrophotographic elements there have typically been used inorganic ones using selenium and its alloys or dispersed coloring matter-sensitized zinc oxides in a binder resin, and organic ones using charge transfer complexes of 2,4,7-trinitro9-fluorenone (which will be called TNF hereinafter) and poly-N-vinylcarbazole (which will be called PVK hereinafter) and the like. However, the fact is that these elements have a number of advantages as well as various disadvantages. For instance, the now widely used selenium element is defective in that the manufacturing conditions are complicated, the production cost is expensive, it is hardly worked into a belt-like one due to lack of flexibility, and attention must be paid in handling because it is very sensitive to heat and mechanical impact. The zinc oxide element is inexpensive because it can be prepared by coating the substrate with a cheap zinc oxide, but defective in that it is generally inferior in sensitivity and mechanical properties such as surface smoothness, tensile strength, friction resistance and the like. Therefore, the zinc oxide element involves various problems such as durability and the like when used repeatedly in plain paper copying machines. And, the element using the charge transfer complex of TNF and PVK is too low in sensitivity to be suitably used in high-speed copying machines.

Of late years, a wide range of studies has been carried out in order to eliminate the shortcomings inherent in these elements. In particular, various organic elements have been proposed for that purpose. Among them, multilayer type elements are attracting public attention as elements for use in plain paper copying machines due to their high sensitivity and stable chargeability as compared with usual organic elements, said multilayer type element comprising an electrically conductive substrate; a thin charge carrier generating layer formed on said substrate by depositing a charge carrier generating pigment capable of generating charge carriers on exposure to light in the proper way, for instance, such as vacuum vapor-deposition, coating a pigment solution or coating a dispersion of fine powdery pigment in a resin solution; and a charge transfer layer, formed thereon, in which the charge carriers generated by the charge carrier generating layer can be injected with efficiency and transferred, said charge transfer layer (normally comprising a charge transfer substance and a binder resin). And, some of them are put to practical use.

As the conventional multilayer type elements of this sort there are known (1) the multilayer type element using, as the charge carrier generating layer, a thin layer formed by vacuum-vapordepositing a perylene derivative and incorporating an oxadiazole derivative in the charge transfer layer (which see U.S. Pat. No. 3871882), (2) the multilayer type element using, as the charge carrier generating layer, a thin layer formed by coating an organic amine solution of Chloro Dian Blue and incorporating a hydrazone compound in the charge transfer layer (which see Japanese Patent Publication No. 42380/1980), (3) the multilayer type element using, as the charge carrier generating layer, a thin layer formed by coating an organic solvent dispersion of distyrylbenzene type disazo compound and incorporating a hydrazone compound in the charge transfer layer (which see Japanese Laid Open Patent Application No. 84943/1980), and the like.

However, the fact is that even in the multilayer type elements of this sort the conventional ones have a number of advantages as well as various disadvantages.

The element using the perylene and oxadiazole derivatives disclosed in the preceding (1) involves the problems that the cost of production is raised because the charge carrier generating layer is formed by vacuum vapordeposition, and the sensitivity is insufficient to be used in the higher speed copying machines even if there is caused no problem when used for practical purpose.

The element using the Chloro Dian Blue and hydrazone compound disclosed in the preceding (2) is superior in sensitivity but involves many disadvantages in the preparation because there is necessity of using a hart-to-handle organic amine (for instance, ethylenediamine) as a coating solvent for the formation of the charge carrier generating layer. Further, this element is inferior in the reproductivity of red images from the original because its visible light wavelengths cover the range of about 450 to 660 nm. This necessitates to employ a filter to cut a red light when setting this element actually in the copying machine, thereby exerting an unprofit-influence upon the copying machine design.

The element using the distyrylbenzene type disazo compound and hydrazone compound disclosed in the preceding (3) is very profitable in the preparation because the charge carrier generating layer can be formed readily by coating a dispersion of disazo compound, but is defective, like the element disclosed in the preceding (2), in that the reproductivity of red images from the original is inferior because its visible light wavelengths cover the range of about 450 to 660 nm.

As the disazo compounds used as charge carrier generating substances in the multilayer type elements there are also known for instance the benzidine type disazo compound disclosed in Japanese Laid Open Patent Application Nos. 37543/1972 and 55643/1977, the stilbene type disazo compound disclosed in Japanese Laid Open Patent Application No. 8832/1977 and the like.

However, the multilayer type elements using these conventional disazo compound were generally inferior in sensitivity and deteriorated in the reproductivity of red images from the original because its visible light wavelengths cover the range of about 450 to 700 nm. Accordingly, these elements exerted an unprofitable influence upon the copying machine design because the above disadvantages necessitate to employ a filter to cut a red light when setting these elements actually in the copying machines.

SUMMARY OF THE INVENTION

It is an object of the present invention to provide a novel disazo compound used effectively in electrophotographic elements, in particular the above mentioned multilayer type elements.

It is another object of the present invention to provide a method of making said disazo compound.

It is a further object of the present invention to developer a multilayer type element which can be produced readily, is high in sensitivity and whose visible light wavelengths are localized in the short wavelength range (in other words, which is superior in the reproductivity of red images from the original).

That is, the present invention primarily relates to a novel disazo compound having the general formula (1):

(1)

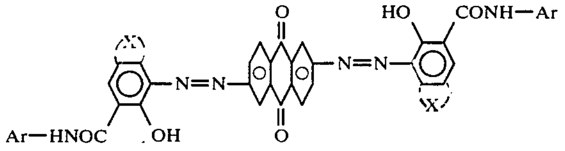

(wherein X represents a substituted or unsubstituted aromatic or hetero ring, and Ar represents a substituted or unsubstituted aromatic or hetero ring).

As the concrete examples of the aromatic ring represented by X in the general formula (1) there are enumerated a benzene ring, a naphthalene ring and the like. As the concrete examples of the hetero ring represented by X in the general formula (1) there are enumerated an indole ring, a carbazole ring, a benzofuran ring and the like. Further, as the concrete examples of the aromatic ring represented by Ar there are enumerated a benzene ring, a naphthalene ring and the like, and as the concrete examples of the hetero ring represented by Ar there are enumerated a dibenzofuran ring, a carbazole ring and the like.

As the concrete examples of the substituents on the rings mentioned above there are enumerated methoxy, ethoxy, methyl, ethyl, chloro, bromo, iodo, fluoro, trifluoromethyl, cyano, nitro carboxy $-COOC_2H_5$, dimethylamino, $-SO_3Na$ tertiary-butoxy and the like.

The disazo compound according to the present invention is effectively used as a charge carrier generating substance. Therefore, the multilayer type element using this disazo compound is high in sensitivity as compared with the element using the conventional disazo compound, and further the element of the present invention is superior in the reproductivity of red images from the original because its visible light wavelengths are localized only at the short wavelength side (about 450 to 600 nm) of the visible light region.

The present invention secondarily relates to a method of making a disazo compound having the general formula (1):

(1)

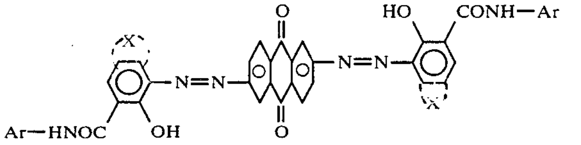

(wherein X represents a substituted or unsubstituted aromatic ring or hetero ring, and Ar represents a substituted or unsubstituted aromatic ring or hetero ring) which comprises diazotizing 2,6-diaminoanthraquinone having the formula (2):

(2)

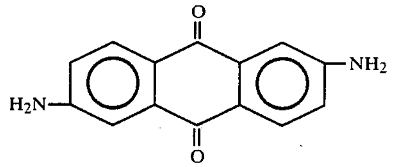

into tetrazonium salt having the general formula (3):

(3)

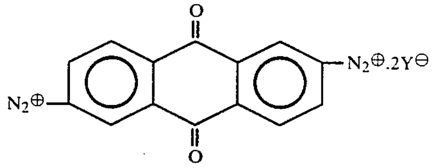

(wherein Y represents an anion functional group) and reacting this salt with a coupler having the general formula (4):

(4)

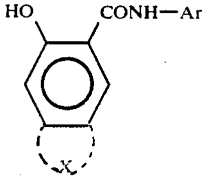

(wherein X and Ar are the same as defined above).

The concrete examples of X and Ar in the general formula (4) are the same as those in the general formula (1).

In this method, diazotization of 2,6-diaminoanthraquinone is carried out by adding sodium nitrite thereto to a temperature of $-10°$ C. to $10°$ C. in an inorganic acid, for instance, such as hydrochloric acid or sulfuric acid. This diazotization reaction completes in the time ranging from 30 minutes to 3 hours. The resulting reaction mixture is further added with for instance borofluoric acid or an aqueous sodium borofluoride solution to cause precipitation of tetrazonium salt. In this instance, it is preferable that precipitated crystals are filtrated therefrom and then employed in the next reaction step. Then, this tetrazonium salt is reacted with said coupler having the general formula (4) to thereby cause a coupling reaction. Practically, this reaction is carried out by previously preparing a mixed solution of tetrazonium salt and coupler in an organic solvent such as N,N-dimethylformamide (DMF), dimethyl sulfoxide or the like and dropping an aqueous alkali solution, for instance, such as an aqueous sodium acetate solution in this mixed solution at a temperature of −10° C. to 40° C. This reaction completes in about 5 minutes to 3 hours. After completion of said reaction, separated crystals are removed by filtration and refined by a proper way (for instance, washing with water or/and organic solvent, recrystallization or the like). Thus, the preparation of said disazo compound is completed.

The present invention thirdly relates to a multilayer type electrophotographic element comprising forming, on an electrically conductive substrate, a charge carrier generating layer and a charge transfer layer, wherein said charge carrier generating layer a disazo compound having the general formula (1):

(1)

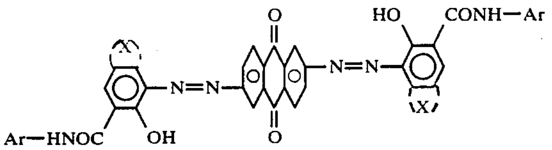

(wherein X represents a substituted or unsubstituted aromatic or hetero ring, and Ar represents a substituted or unsubstituted aromatic or hetero ring.).

The concrete examples of the aromatic ring represented by X in the general formula (1) include a benzene ring, a naphthalene ring and the like. The concrete examples of the hetero ring include an indole ring, a carbazole ring, a benzofuran ring and the like. The concrete examples of the aromatic ring represented by Ar include a benzene ring, a naphthalene ring and the like. The concrete examples of the hetero ring represented by Ar include a dibenzofuran ring, a carbazole ring and the like. As the concrete examples of the substituents on the rings mentioned above there are enumerated methoxy, ethoxy, methyl, ethyl, chloro, bromo, iodo, fluoro, trifluoromethyl, cyano, nitro, carboxy, $-COOC_2H_5$, dimethylamino, $-SO_3Na$ tertiary-butoxy and the like. The multilayer type element according to the present invention should be said to be a superior one for use in copying machines because it is produced readily, high in sensitivity and further its visible light wavelengths are localized at the short wavelength region (450 to 600 nm).

Next, the concrete examples of the disazo compound according to the present invention will be shown in Table 1 and Table 2.

TABLE 1

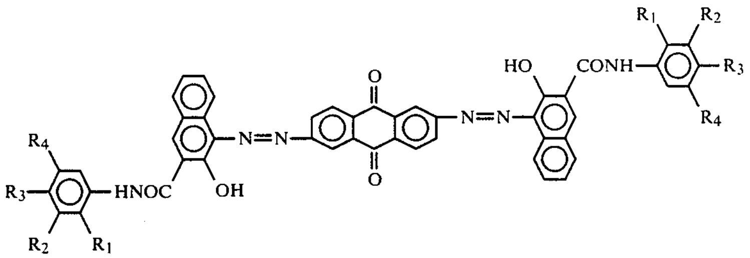

| Compound No. | $R_1$ | $R_2$ | $R_3$ | $R_4$ |
|---|---|---|---|---|
| 1-1 | $-OCH_3$ | H | H | H |
| 1-2 | H | $-OCH_3$ | H | H |
| 1-3 | H | H | $-OCH_3$ | H |
| 1-4 | $-OC_2H_5$ | H | H | H |
| 1-5 | H | $-OC_2H_5$ | H | H |
| 1-6 | H | H | $-OC_2H_5$ | H |
| 1-7 | $-CH_3$ | H | H | H |
| 1-8 | H | $-CH_3$ | H | H |
| 1-9 | H | H | $-CH_3$ | H |
| 1-10 | $C_2H_5$ | H | H | H |
| 1-11 | H | $-C_2H_5$ | H | H |
| 1-12 | H | H | $-C_2H_5$ | H |
| 1-13 | H | H | H | H |
| 1-14 | Cl | H | H | H |
| 1-15 | H | Cl | H | H |
| 1-16 | H | H | Cl | H |
| 1-17 | Br | H | H | H |
| 1-18 | H | Br | H | H |
| 1-19 | H | H | Br | H |
| 1-20 | I | H | H | H |
| 1-21 | H | I | H | H |
| 1-22 | H | H | I | H |
| 1-23 | F | H | H | H |
| 1-24 | H | F | H | H |
| 1-25 | H | H | F | H |
| 1-26 | $-CF_3$ | H | H | H |
| 1-27 | H | $-CF_3$ | H | H |
| 1-28 | H | H | $-CF_3$ | H |
| 1-29 | $-CN$ | H | H | H |
| 1-30 | H | $-CN$ | H | H |
| 1-31 | H | H | $-CN$ | H |
| 1-32 | $-NO_2$ | H | H | H |
| 1-33 | H | $-NO_2$ | H | H |
| 1-34 | H | H | $-NO_2$ | H |
| 1-35 | H | H | $-COOH$ | H |

TABLE 1-continued
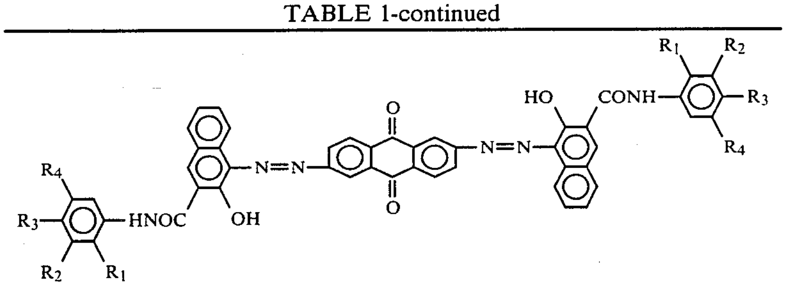
| Compound No. | $R_1$ | $R_2$ | $R_3$ | $R_4$ |
|---|---|---|---|---|
| 1-36 | H | H | $-COOC_2H_5$ | H |
| 1-37 | H | H | 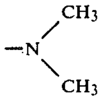 | H |
| 1-38 | $-OCH_3$ | H | H | $-OCH_3$ |
| 1-39 | $-OC_2H_5$ | H | H | $-OC_2H_5$ |
| 1-40 | $-CH_3$ | H | H | $-CH_3$ |
| 1-41 | Cl | H | H | Cl |
| 1-42 | $-CH_3$ | H | H | Cl |
| 1-43 | $-OCH_3$ | H | $-OCH_3$ | H |
| 1-44 | $-CH_3$ | H | $-CH_3$ | H |
| 1-45 | $-CH_3$ | H | Cl | H |
| 1-46 | $-NO_2$ | H | $-OCH_3$ | H |
| 1-47 | H | $-OCH_3$ | H | $-OCH_3$ |
| 1-48 | $-OCH_3$ | H | H | Br |
| 1-49 | $-CH_3$ | H | $-OCH_3$ | H |
| 1-50 | $-OCH_3$ | H | Cl | $-OCH_3$ |
| 1-51 | $-OCH_3$ | H | $-OCH_3$ | Cl |
| 1-52 | H | H | $-SO_3Na$ | H |
| 1-53 | H | H | $-OC_4H_9$ (tert) | H |
TABLE 2
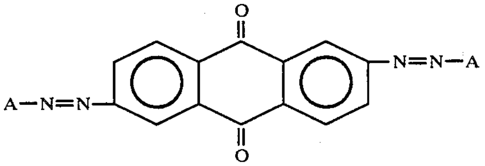
| Compound No. | A |
|---|---|
| 1-54 | 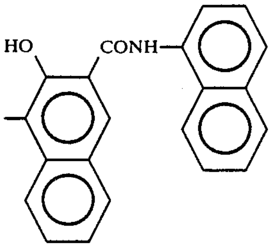 |
| 1-55 | 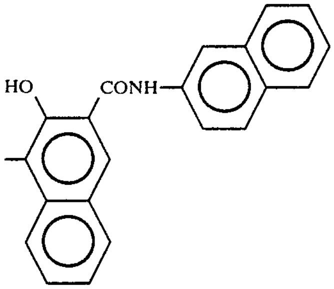 |
TABLE 2-continued
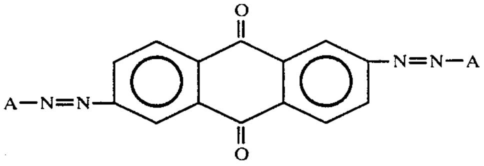
| Compound No. | A |
|---|---|
| 1-56 | 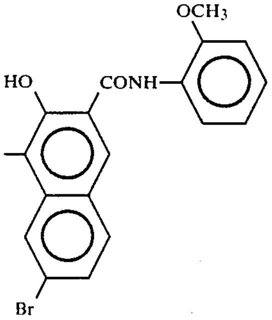 |

TABLE 2-continued
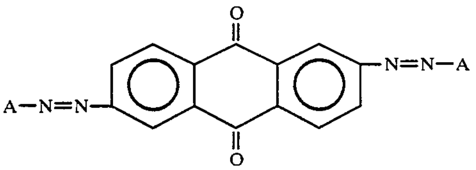
| Compound No. | A |
|---|---|
| 1-57 | 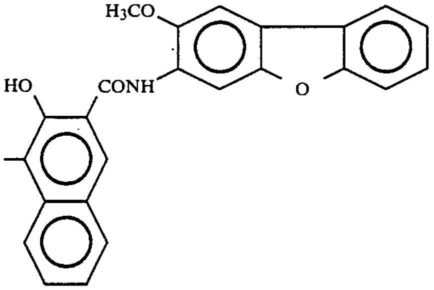 |
| 1-58 | 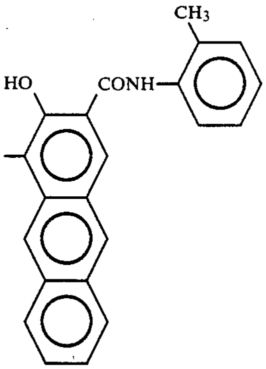 |
| 1-59 | 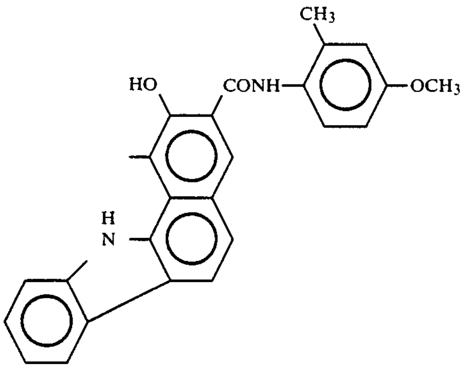 |
| 1-60 | 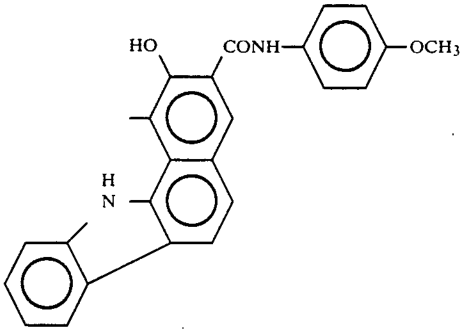 |
TABLE 2-continued
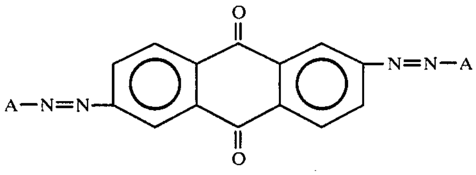
| Compound No. | A |
|---|---|
| 1-61 | 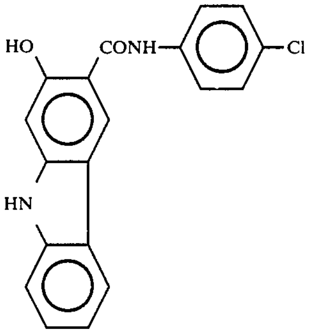 |
| 1-62 | 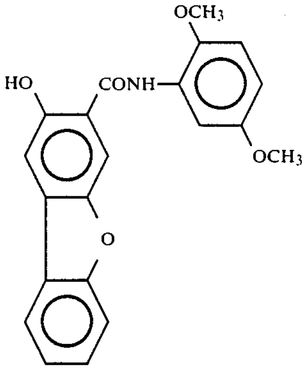 |
| 1-63 | 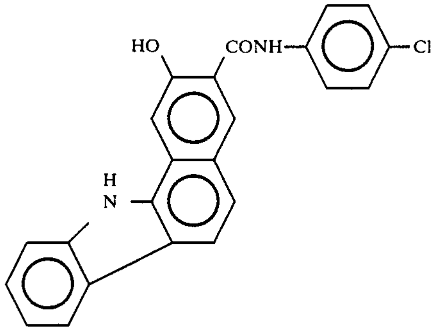 |
| 1-64 | 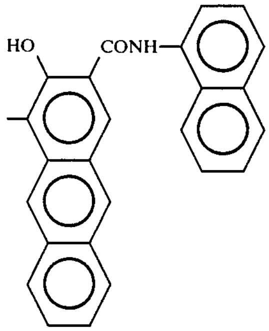 |

TABLE 2-continued

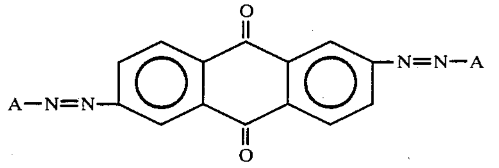

| Compound No. | A |
|---|---|
| 1-65 | 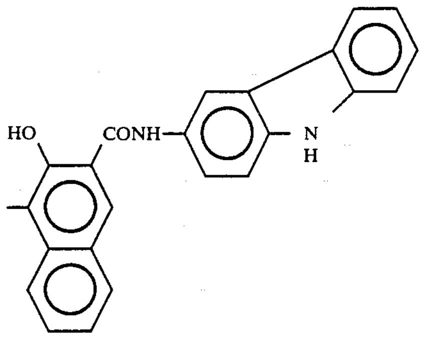 |

FIG. 1 is a grossly enlarged sectional view of an electrophotographic element embodying the present invention. This element is designed to form, on an electrically conductive substrate 11, a photosensitive layer 44 comprising a charge carrier generating layer 22 and a charge transfer layer 33.

As the electrically conductive layer suitably used in the present invention there can be enumerated metal plates, metal drums or metal foil of aluminum, nickel, chromium and the like, plastic films provided with thin layers of aluminum, tin oxide, indium oxide, chromium, palladium and the like, and electrically conductive substance-coated or impregnated paper or plastic films.

The charge carrier generating layer is formed on the electrically conductive substrate by coating the surface of the substrate with a dispersion obtained by dispersing, in a suitable solvent, very fine powders of the above specified disazo compound having the general formula (1) pulverized by means of a ball mill or the like and if needed, dissolving a binder resin thereto. The thus formed charge carrier generating layer is surface-finished for instance by buffing or the like and the film thickness is regulated as occasion demands.

Among the disazo compounds enumerated in Table 1 and Table 2, the compounds numbered 1-15, 1-16, 1-18, 1-19, 1-27, 1-28, 1-30, 1-31, 1-33, 1-34, 1-41, 1-42, 1-45, 1-56 and 1-60 are particularly preferable.

The thickness of this charge carrier generating layer is 0.01 to 5 μm, preferably 0.05 to 2 μm. The percentage of disazo compound contained in the charge carrier generating layer is 10 to 100% by weight, preferably 30 to 95% by weight. In case the film thickness of the charge carrier generating layer is less than 0.01 μm the sensitivity deteriorates, and in case the film thickness is above 5 μm the potential retainability deteriorates. Further, in case the percentage of disazo pigment contained in the charge carrier generating layer is less than 10% by weight the sensitivity deteriorates.

The charge transfer layer is formed by coating the surface of said charge carrier generating layer with a solution obtained by dissolving various charge transfer substances and binder resins referred to afterwards in a proper solvent for instance such as tetrahydrofuran or the like. The percentage of the charge transfer substance contained in the charge transfer layer is 10 to 80% by weight, preferably 25 to 75% by weight, and the film thickness of said layer is 2 to 100 μm, preferably 5 to 40 μm. In case the percentage of the charge transfer substance contained in the charge transfer layer is less than 10% by weight the sensitivity deteriorates, while in case said percentage is above 80% by weight there are brought about undesirable results such that the film becames brittle and the charge transfer layer becomes cloudy due to separated crystals. In case the thickness of the charge transfer layer is less than 5 μm the potential retainability deteriorates and in case said thickness is above 40 μm the residual potential rises.

The typical examples of the charge transfer substance used in the charge transfer layer will be shown below (1) a hydrazone compound having the general formula:

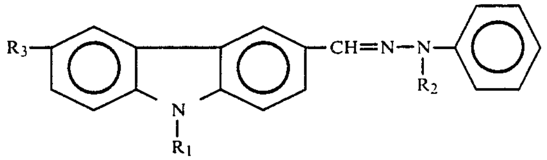

(wherein $R_1$ is methyl, ethyl, 2-hydroxyethyl or 2-chloroethyl, $R_2$ is methyl, ethyl, benzyl or phenyl, and $R_3$ is hydrogen, chlorine, bromine, $C_1$ to $C_4$ alkyl, $C_1$ to $C_4$ alkoxyl, dialkylamino or nitro.).

(2) a hydrazone compound having the general formula:

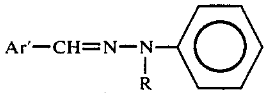

(wherein Ar′ is a naphthalin ring, an anthracene ring, styryl and their substituents or a pyridine ring, a furan ring or a thiophene ring, and R is $C_1$ to $C_4$ alkyl or benzyl.).

(3) a hydrazone compound having the general formula:

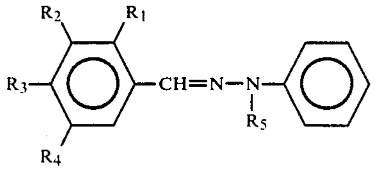

(wherein $R_1$, $R_2$, $R_3$ and $R_4$ each is hydrogen, $C_1$ to $C_3$ alkyl, $C_1$ to $C_3$ alkoxy, dialkylamino or benzylamino, and $R_5$ is alkyl or benzyl.).

(4) a hydrazone compound having the general formula:

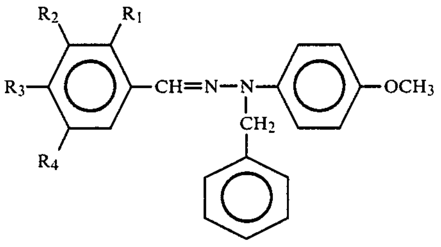

(wherein $R_1$, $R_2$, $R_3$ and $R_4$ each is hydogen, $C_1$ to $C_3$ alkyl, $C_1$ to $C_3$ alkoxy, substituted or unsubstituted dialkylamino, dibenzylamino or halogen.).

(5) a diaryl methane compound having the general formula:

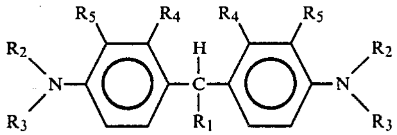

(wherein $R_1$ is $C_1$ to $C_{11}$ alkyl, substituted or unsubstituted phenyl or heterocyclic, $R_2$ and $R_3$, which may be same or different, each is hydrogen, $C_1$ to $C_4$ alkyl, hydroxyalkyl, chloroalkyl, substituted or unsubstituted aralkyl and $R_2$ and $R_3$ may be combined to form a nitrogen-containing heterocycle. $R_4$ and $R_5$, which may be same or different, each is hydrogen, $C_1$ to $C_4$ alkyl, $C_1$ to $C_4$ alkoxyl or halogen.).

(6) an anthracene compound having the general formula:

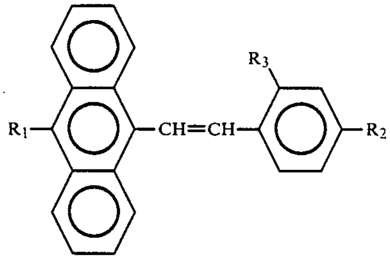

(wherein $R_1$ is hydrogen or halogen, $R_2$ is hydrogen, $C_1$ to $C_4$ alkyl, $C_1$ to $C_4$ alkoxyl, dialkylamino or substituted or unsubstituted diaralkylamino, and $R_3$ is hydrogen, $C_1$ to $C_4$ alkyl or halogen.).

(7) a fluorene compound having the general formula:

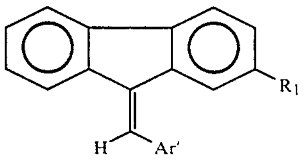

(wherein $R_1$ is hydrogen, halogen, cyano, $C_1$ to $C_4$ alkoxyl or $C_1$ to $C_4$ alkyl, and Ar' is

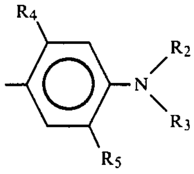

or

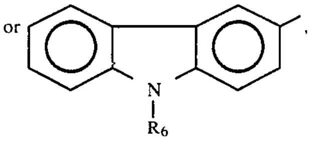

$R_2$, $R_3$ and $R_6$ each being hydrogen, $C_1$ to $C_4$ substituted or unsubstituted $C_1$ to $C_4$ alkyl or substituted or unsubstituted benzyl, $R_4$ and $R_5$ each being hydrogen, halogen, $C_1$ to $C_4$ alkyl, $C_1$ to $C_4$ alkoxyl or dialkylamino.).

(8) a divinylbenzene compound having the general formula:

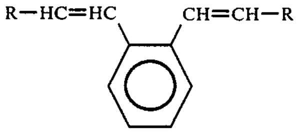

(wherein R is carbazolyl, pyridyl, thienyl, indolyl, furyl or substituted or unsubstituted phenyl, styryl, naphthyl or anthryl, these substituents being selected from the group consisting of dialkylamino, $C_1$ to $C_4$ alkyl, $C_1$ to $C_4$ alkoxyl, halogen, aralkylamino, N-alkyl-N-aralkylamino and amino.).

(9) a pyrazoline compound having the general formula:

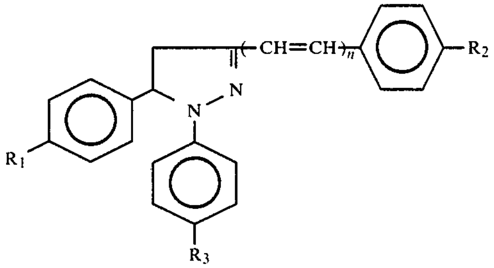

(wherein $R_1$, $R_2$ and $R_3$ each is hydrogen, $C_1$ to $C_4$ alkyl, $C_1$ to $C_4$ alkoxyl, dialkylamino or halogen, and n is an integer such as 0 or 1.).

Next, the concrete examples of the charge transfer substance used in the charge transfer layer will be shown below.

TABLE 3

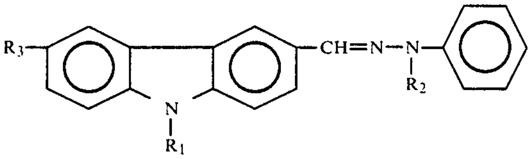

| Compound No. | $R_1$ | $R_2$ | $R_3$ |
|---|---|---|---|
| 2-1 | $-CH_3$ | $-CH_3$ | H |
| 2-2 | $-CH_3$ | $-C_2H_5$ | H |
| 2-3 | $-CH_3$ | 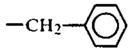 | H |

TABLE 3-continued

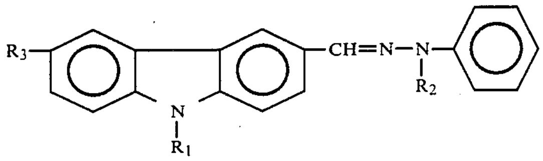

| Compound No. | $R_1$ | $R_2$ | $R_3$ |
|---|---|---|---|
| 2-4 | $-CH_3$ | 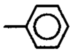 | H |
| 2-5 | $-C_2H_5$ | $-CH_3$ | H |
| 2-6 | $-C_2H_5$ | $-C_2H_5$ | H |
| 2-7 | $-C_2H_5$ | $-CH_2$ 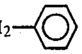 | H |
| 2-8 | $-C_2H_5$ | 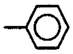 | H |
| 2-9 | $-C_2H_4OH$ | $-CH_3$ | H |
| 2-10 | $-C_2H_4OH$ | $-C_2H_5$ | H |
| 2-11 | $-C_2H_4OH$ | $-CH_2$ 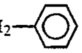 | H |
| 2-12 | $-C_2H_4OH$ | 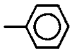 | H |
| 2-13 | $-C_2H_4Cl$ | $-CH_3$ | H |
| 2-14 | $-C_2H_4Cl$ | $-C_2H_5$ | H |
| 2-15 | $-C_2H_4Cl$ | $-CH_2$ 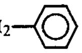 | H |
| 2-16 | $-C_2H_4Cl$ | 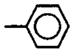 | H |
| 2-17 | $-CH_3$ | $-CH_3$ | Cl |
| 2-18 | $-CH_3$ | $-C_2H_5$ | Br |
| 2-19 | $-CH_3$ | $-C_2H_5$ | $-OCH_3$ |
| 2-20 | $-CH_3$ | $-C_2H_5$ | $-NO_2$ |
| 2-21 | $-CH_3$ | $-CH_2$ 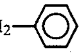 | Cl |
| 2-22 | $-CH_3$ | $-CH_2$ 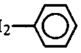 | 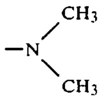 |
| 2-23 | $-CH_3$ | 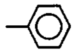 | 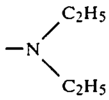 |
| 2-24 | $-C_2H_5$ | $-CH_3$ | Cl |
| 2-25 | $-C_2H_5$ | $-CH_3$ | $-OCH_3$ |
| 2-26 | $-C_2H_5$ | $-CH_3$ | $-NO_2$ |
| 2-27 | $-C_2H_5$ | $-CH_2$ 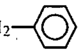 | Cl |
| 2-28 | $-C_2H_5$ | $-CH_2$ 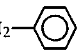 | $-OC_2H_5$ |

TABLE 3-continued

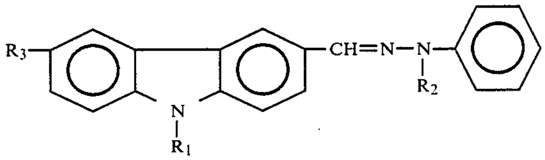

| Compound No. | $R_1$ | $R_2$ | $R_3$ |
|---|---|---|---|
| 2-29 | $-C_2H_5$ | $-CH_2$ 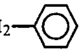 | $-CH_3$ |
| 2-30 | $-C_2H_5$ | $-CH_2$ 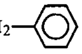 | Br |
| 2-31 | $-C_2H_5$ | $-CH_2$ 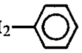 | 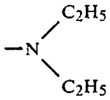 |
| 2-32 | $-C_2H_4OH$ | $-CH_3$ | $-OC_2H_5$ |
| 2-33 | $-C_2H_4OH$ | $-CH_3$ | $-C_2H_5$ |
| 2-34 | $-C_2H_4OH$ | $-CH_3$ | 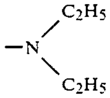 |
| 2-35 | $-C_2H_4OH$ | $-C_2H_5$ | Br |
| 2-36 | $-C_2H_4OH$ | $-C_2H_5$ | $-NO_2$ |
| 2-37 | $-C_2H_4OH$ | $-CH_2$ 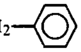 | $-C_2H_5$ |
| 2-38 | $-C_2H_4OH$ | $-CH_2$ 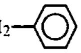 | $-OC_2H_5$ |
| 2-39 | $-C_2H_4OH$ | $-CH_2$ 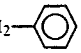 | 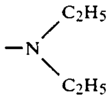 |
| 2-40 | $-C_2H_4OH$ | 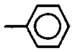 | 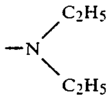 |
| 2-41 | $-C_2H_4Cl$ | $-CH_3$ | Cl |
| 2-42 | $-C_2H_4Cl$ | $-C_2H_5$ | Br |
| 2-43 | $-C_2H_4Cl$ | $-C_2H_5$ | $-NO_2$ |
| 2-44 | $-C_2H_4Cl$ | $-CH_2$ 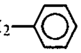 | 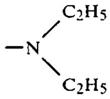 |
| 2-45 | $-C_2H_4Cl$ | 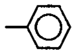 | $-OCH_3$ |
| 2-46 | $-C_2H_4Cl$ | 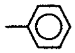 | 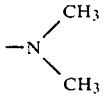 |

TABLE 4
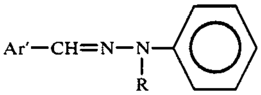
| Compound No. | Ar' | R |
|---|---|---|
| 2-47 | 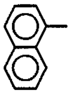 | $-CH_3$ |
| 2-48 | 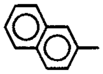 | $-CH_3$ |
| 2-49 | 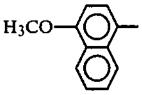 | $-CH_3$ |
| 2-50 | 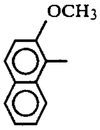 | $-CH_3$ |
| 2-51 | 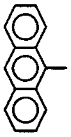 | $-CH_3$ |
| 2-52 | 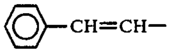 | $-CH_3$ |
| 2-53 | 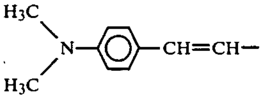 | $-CH_3$ |
| 2-54 | 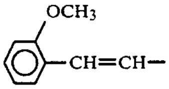 | $-CH_3$ |
| 2-55 | 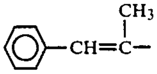 | $-CH_3$ |
TABLE 4-continued
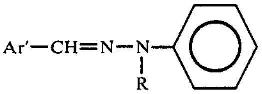
| Compound No. | Ar' | R |
|---|---|---|
| 2-56 | 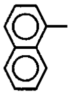 | 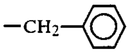 |
| 2-57 | 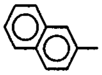 | 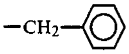 |
| 2-58 | 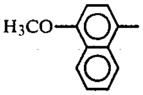 | 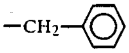 |
| 2-59 | 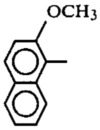 | 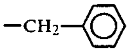 |
| 2-60 | 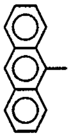 | 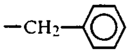 |
| 2-61 | 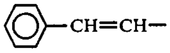 | 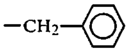 |
| 2-62 | 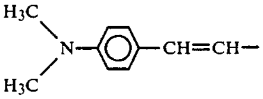 | 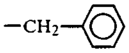 |
| 2-63 | 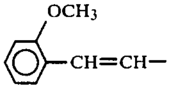 | 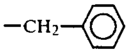 |
| 2-64 | 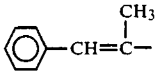 | 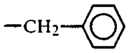 |
TABLE 5
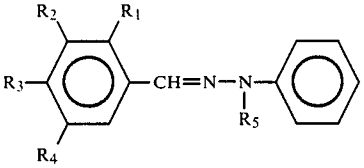
| Compound No. | $R_1$ | $R_2$ | $R_3$ | $R_4$ | $R_5$ |
|---|---|---|---|---|---|
| 2-65 | H | H | H | H | $-CH_3$ |
| 2-66 | H | H | $-CH_3$ | H | $-CH_3$ |
| 2-67 | H | H | $-C_2H_5$ | H | $-CH_3$ |
| 2-68 | $-CH_3$ | H | $-CH_3$ | H | $-CH_3$ |
| 2-69 | $-CH_3$ | H | H | $-CH_3$ | $-CH_3$ |
| 2-70 | H | H | $-OCH_3$ | H | $-CH_3$ |
| 2-71 | H | $-OCH_3$ | H | H | $-CH_3$ |

TABLE 5-continued
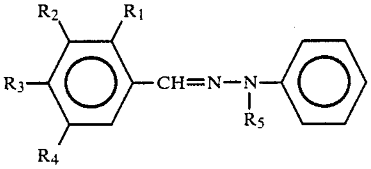
| Compound No. | $R_1$ | $R_2$ | $R_3$ | $R_4$ | $R_5$ |
|---|---|---|---|---|---|
| 2-72 | $-OCH_3$ | H | H | H | $-CH_3$ |
| 2-73 | $-OCH_3$ | $-OCH_3$ | H | H | $-CH_3$ |
| 2-74 | $-OCH_3$ | H | $-OCH_3$ | H | $-CH_3$ |
| 2-75 | $-OCH_3$ | H | H | $-OCH_3$ | $-CH_3$ |
| 2-76 | H | $-OCH_3$ | $-OCH_3$ | H | $-CH_3$ |
| 2-77 | H | $-OCH_3$ | H | $-OCH_3$ | $-CH_3$ |
| 2-78 | $-OCH_3$ | $-OCH_3$ | $-OCH_3$ | H | $-CH_3$ |
| 2-79 | H | $-OCH_3$ | $-OCH_3$ | $-OCH_3$ | $-CH_3$ |
| 2-80 | H | H | $-OC_2H_5$ | H | $-CH_3$ |
| 2-81 | $-OC_2H_5$ | H | H | H | $-CH_3$ |
| 2-82 | H | $-OC_2H_5$ | $-OC_2H_5$ | H | $-CH_3$ |
| 2-83 | H | H | 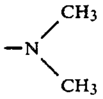 | H | $-CH_3$ |
| 2-84 | H | H | 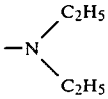 | H | $-CH_3$ |
| 2-85 | H | H | 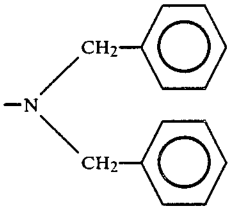 | H | $-CH_3$ |
| 2-86 | H | H | H | H | 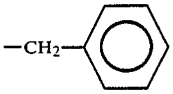 |
| 2-87 | H | H | $-CH_3$ | H | 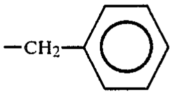 |
| 2-88 | H | H | $-C_2H_5$ | H | 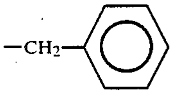 |
| 2-89 | $-CH_3$ | H | $-CH_3$ | H | 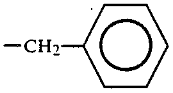 |
| 2-90 | $-CH_3$ | H | H | $-CH_3$ | 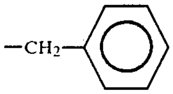 |
| 2-91 | H | H | $-OCH_3$ | H | 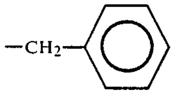 |

TABLE 5-continued
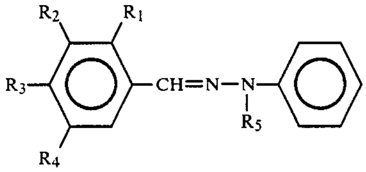
| Compound No. | $R_1$ | $R_2$ | $R_3$ | $R_4$ | $R_5$ |
|---|---|---|---|---|---|
| 2-92 | H | $-OCH_3$ | H | H | 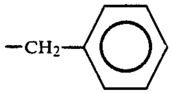 |
| 2-93 | $-OCH_3$ | H | H | H | 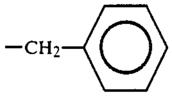 |
| 2-94 | $-OCH_3$ | $-OCH_3$ | H | H | 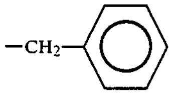 |
| 2-95 | $-OCH_3$ | H | $-OCH_3$ | H | 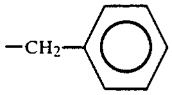 |
| 2-96 | $-OCH_3$ | H | H | $-OCH_3$ | 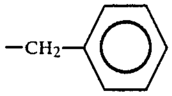 |
| 2-97 | H | $-OCH_3$ | $-OCH_3$ | H | 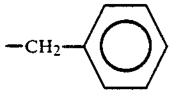 |
| 2-98 | H | $-OCH_3$ | H | $-OCH_3$ | 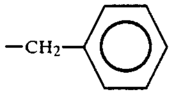 |
| 2-99 | $-OCH_3$ | $-OCH_3$ | $-OCH_3$ | H | 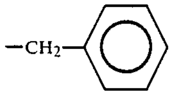 |
| 2-100 | H | $-OCH_3$ | $-OCH_3$ | $-OCH_3$ | 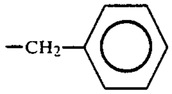 |
| 2-101 | H | H | $-OC_2H_5$ | H | 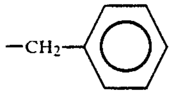 |
| 2-102 | $-OC_2H_5$ | H | H | H | 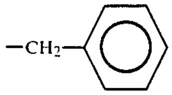 |
| 2-103 | H | $-OC_2H_5$ | $-OC_2H_5$ | H | 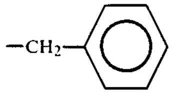 |

TABLE 5-continued

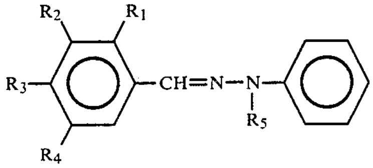

| Compound No. | R1 | R2 | R3 | R4 | R5 |
|---|---|---|---|---|---|
| 2-104 | H | H | 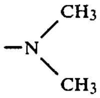 | H | 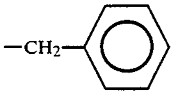 |
| 2-105 | H | H | 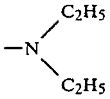 | H | 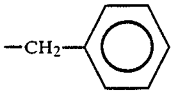 |
| 2-106 | H | H | 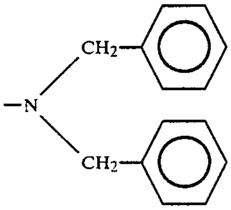 | H | 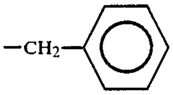 |

TABLE 6

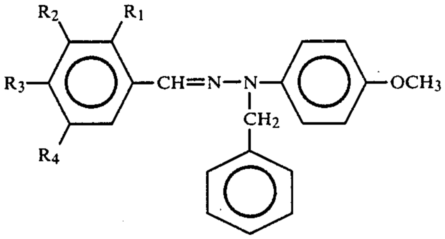

| Compound No. | R1 | R2 | R3 | R4 |
|---|---|---|---|---|
| 2-107 | H | H | H | H |
| 2-108 | H | H | $-CH_3$ | H |
| 2-109 | H | $-CH_3$ | H | H |
| 2-110 | $-CH_3$ | H | H | H |
| 2-111 | H | H | $-C_2H_5$ | H |
| 2-112 | $-CH_3$ | H | $-CH_3$ | H |
| 2-113 | $-CH_3$ | H | H | $-CH_3$ |
| 2-114 | H | H | $-OCH_3$ | H |
| 2-115 | H | $-OCH_3$ | H | H |
| 2-116 | $-OCH_3$ | H | H | H |
| 2-117 | $-OCH_3$ | $-OCH_3$ | H | H |
| 2-118 | $-OCH_3$ | H | $-OCH_3$ | H |
| 2-119 | $-OCH_3$ | H | H | $-OCH_3$ |
| 2-120 | H | $-OCH_3$ | $-OCH_3$ | H |
| 2-121 | H | $-OCH_3$ | H | $-OCH_3$ |
| 2-122 | $-OCH_3$ | $-OCH_3$ | $-OCH_3$ | H |
| 2-123 | H | $-OCH_3$ | $-OCH_3$ | $-OCH_3$ |
| 2-124 | H | H | $-OC_2H_5$ | H |
| 2-125 | $-OC_2H_5$ | H | H | H |
| 2-126 | H | $-OC_2H_5$ | $-OC_2H_5$ | H |
| 2-127 | H | H | 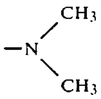 | H |

TABLE 6-continued

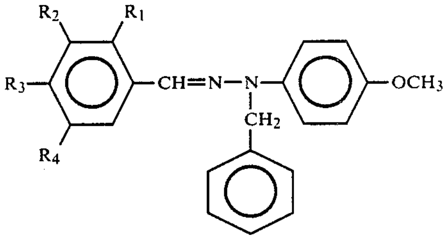

| Compound No. | R1 | R2 | R3 | R4 |
|---|---|---|---|---|
| 2-128 | H | H | 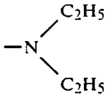 | H |
| 2-129 | $-CH_3$ | H | 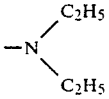 | H |
| 2-130 | Cl | H | 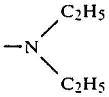 | H |
| 2-131 | H | H | 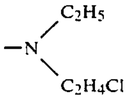 | H |
| 2-132 | H | H | Cl | H |
| 2-133 | H | Cl | H | H |
| 2-134 | Cl | H | H | H |
| 2-135 | H | H | Br | H |
| 2-136 | H | Br | H | H |

TABLE 6-continued
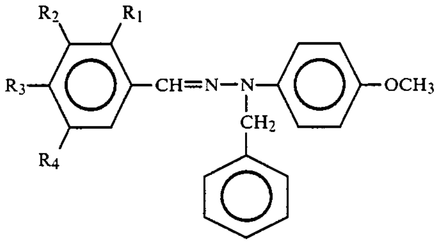
| Compound No. | $R_1$ | $R_2$ | $R_3$ | $R_4$ |
|---|---|---|---|---|
| 2-137 | Br | H | H | H |
| 2-138 | H | H | $-NO_2$ | H |
| 2-139 | H | $-NO_2$ | H | H |
| 2-140 | $-NO_2$ | H | H | H |
| 2-141 | H | H | $-OH$ | H |
| 2-142 | H | $-OH$ | H | H |
| 2-143 | $-HO$ | H | H | H |
TABLE 7
| Compound No. | $R_1$ | $R_2$ | $R_3$ | $R_4$ | $R_5$ |
|---|---|---|---|---|---|
| 2-144 | 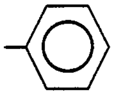 | $-C_2H_5$ | $-C_2H_5$ | H | H |
| 2-145 | 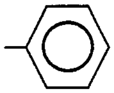 | $-C_2H_5$ | $-C_2H_5$ | $-CH_3$ | H |
| 2-146 | 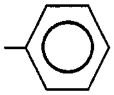 | $-C_2H_5$ | $-C_2H_5$ | H | $-CH_3$ |
| 2-147 | 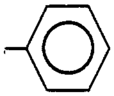 | $-C_2H_5$ | $-C_2H_5$ | H | $-C_2H_5$ |
| 2-148 | 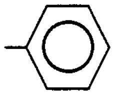 | $-n-C_4H_9$ | $-n-C_4H_9$ | H | H |
| 2-149 | 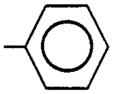 | $-C_2H_4Cl$ | $-C_2H_5$ | H | H |
| 2-150 | 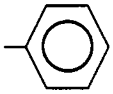 | $-C_2H_4OH$ | $-C_2H_5$ | H | H |
| 2-151 | 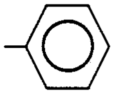 | 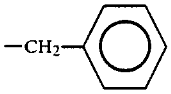 | $-CH_3$ | H | H |
| 2-152 | 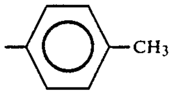 | $-C_2H_5$ | $-C_2H_5$ | H | H |
| 2-153 | 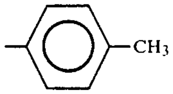 | $-C_2H_5$ | $-C_2H_5$ | $-CH_3$ | H |
| 2-154 | 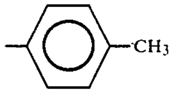 | $-C_2H_5$ | $-C_2H_5$ | H | $-CH_3$ |

TABLE 7-continued
| Compound No. | $R_1$ | $R_2$ | $R_3$ | $R_4$ | $R_5$ |
|---|---|---|---|---|---|
| 2-155 | 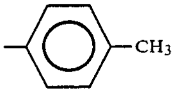 | $-C_2H_5$ | $-C_2H_5$ | H | $-C_2H_5$ |
| 2-156 | 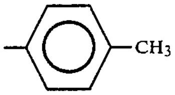 | $-n\text{-}C_4H_9$ | $-n\text{-}C_4H_9$ | H | H |
| 2-157 | 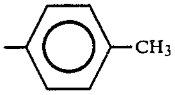 | $-C_2H_4Cl$ | $-C_2H_5$ | H | H |
| 2-158 | 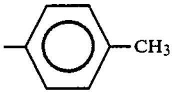 | $-C_2H_4OH$ | $-C_2H_5$ | H | H |
| 2-159 | 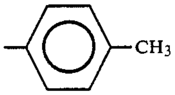 | 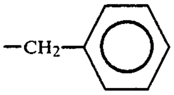 | $-CH_3$ | H | H |
| 2-160 | 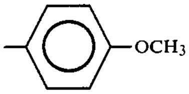 | $-C_2H_5$ | $-C_2H_5$ | H | H |
| 2-161 | 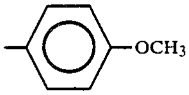 | $-C_2H_5$ | $-C_2H_5$ | $-CH_3$ | H |
| 2-162 | 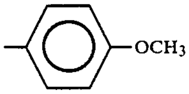 | $-C_2H_5$ | $-C_2H_5$ | H | $-CH_3$ |
| 2-163 | 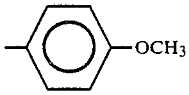 | $-C_2H_5$ | $-C_2H_5$ | H | $-C_2H_5$ |
| 2-164 | 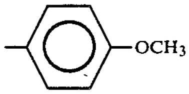 | $-n\text{-}C_4H_9$ | $-n\text{-}C_4H_9$ | H | H |
| 2-165 | 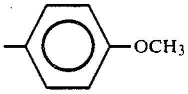 | $-C_2H_4Cl$ | $-C_2H_5$ | H | H |
| 2-166 | 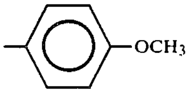 | $-C_2H_4OH$ | $-C_2H_5$ | H | H |
| 2-167 | 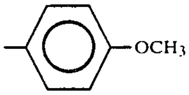 | 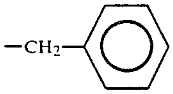 | $-CH_3$ | H | H |

TABLE 7-continued
| Compound No. | $R_1$ | $R_2$ | $R_3$ | $R_4$ | $R_5$ |
|---|---|---|---|---|---|
| 2-168 | $-CH_3$ | 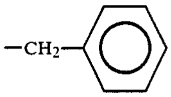 | 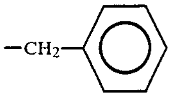 | H | H |
| 2-169 | $-C_2H_5$ | 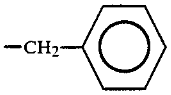 | 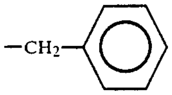 | H | H |
| 2-170 | $-n-C_3H_7$ | 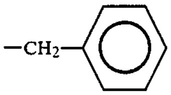 | 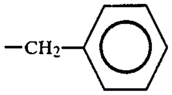 | H | H |
| 2-171 | 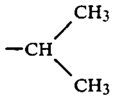 | 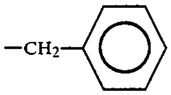 | 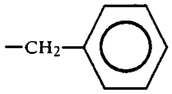 | H | H |
| 2-172 | $-C_5H_{11}$ | 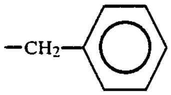 | 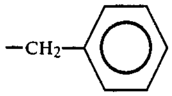 | H | H |
| 2-173 | $-CH(C_2H_5)-(CH_2)_3-CH_3$ | 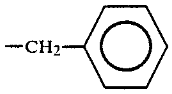 | 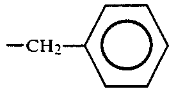 | H | H |
| 2-174 | $-n-C_{11}H_{25}$ | 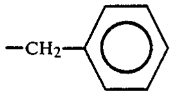 | 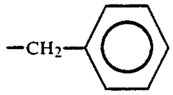 | H | H |
| 2-175 | $-CH_3$ | 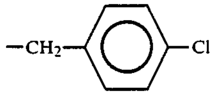 | 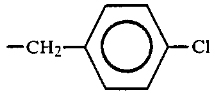 | H | H |
| 2-176 | $-n-C_3H_7$ | 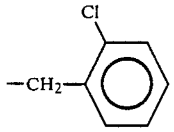 | 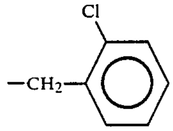 | H | H |
| 2-177 | $-n-C_3H_7$ | 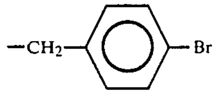 | 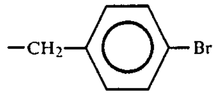 | H | H |
| 2-178 | $-C_2H_5$ | 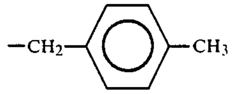 | 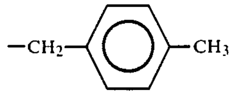 | H | H |
| 2-179 | $-CH(C_2H_5)-(CH_2)_3-CH_3$ | 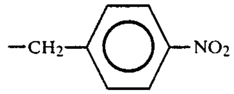 | 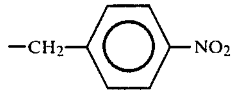 | H | H |
| 2-180 | 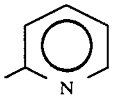 | $-C_2H_5$ | $-C_2H_5$ | H | H |

TABLE 7-continued
| Compound No. | $R_1$ | $R_2$ | $R_3$ | $R_4$ | $R_5$ |
|---|---|---|---|---|---|
| 2-181 | 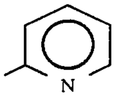 | $-C_2H_5$ | $-C_2H_5$ | $-CH_3$ | H |
| 2-182 | 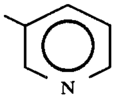 | $-C_2H_5$ | $-C_2H_5$ | H | H |
| 2-183 | 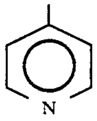 | $-C_2H_5$ | $-C_2H_5$ | H | H |
| 2-184 | 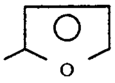 | $-C_2H_5$ | $-C_2H_5$ | H | H |
| 2-185 | 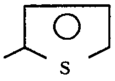 | $-C_2H_5$ | $-C_2H_5$ | H | H |
| 2-186 | 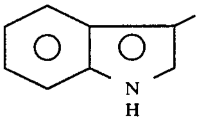 | $-C_2H_5$ | $-C_2H_5$ | H | H |
| 2-187 | 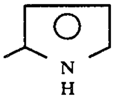 | $-C_2H_5$ | $-C_2H_5$ | H | H |
| 2-188 | 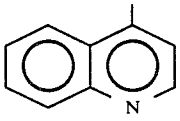 | $-C_2H_5$ | $-C_2H_5$ | H | H |
| 2-189 | 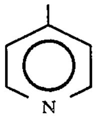 | $-C_2H_5$ | $-C_2H_5$ | $-CH_3$ | H |
| 2-190 | 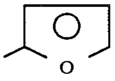 | $-C_2H_5$ | $-C_2H_5$ | $-CH_3$ | H |
| 2-191 | 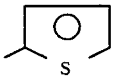 | $-C_2H_5$ | $-C_2H_5$ | $-CH_3$ | H |
| 2-192 | 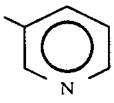 | $-C_2H_5$ | $-C_2H_5$ | H | $-C_2H_5$ |
| 2-193 | 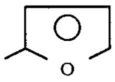 | $-C_2H_5$ | $-C_2H_5$ | H | $-CH_3$ |

TABLE 7-continued
| Compound No. | $R_1$ | $R_2$ | $R_3$ | $R_4$ | $R_5$ |
|---|---|---|---|---|---|
| 2-194 | 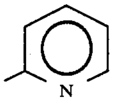 | $-CH_3$ | $-CH_3$ | H | $-C_2H_5$ |
| 2-195 | 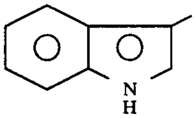 | $-CH_3$ | $-CH_3$ | H | $-C_2H_5$ |
| 2-196 | 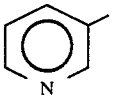 | $-n\text{-}C_4H_9$ | $-n\text{-}C_4H_9$ | H | H |
| 2-197 | 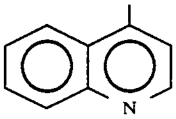 | $-n\text{-}C_4H_9$ | $-n\text{-}C_4H_9$ | H | H |
| 2-198 | 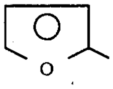 | $-C_2H_4Cl$ | $-C_2H_5$ | H | H |
| 2-199 | 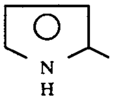 | $-C_2H_4Cl$ | $-C_2H_5$ | H | H |
| 2-200 | 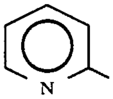 | $-C_2H_4OH$ | $-C_2H_5$ | H | H |
| 2-201 | 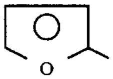 | $-C_2H_4OH$ | $-C_2H_5$ | H | H |
| 2-202 | 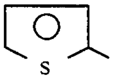 | $-CH_2-$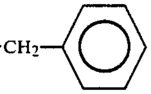 | $-CH_3$ | H | H |
| 2-203 | 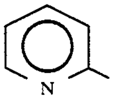 | $-CH_2-$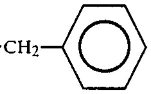 | $-CH_3$ | H | H |
| 2-204 | 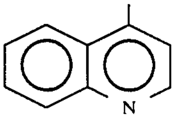 | | 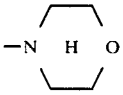 | H | H |
| 2-205 | 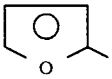 | | 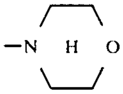 | H | H |

TABLE 7-continued
| Compound No. | $R_1$ | $R_2$ | $R_3$ | $R_4$ | $R_5$ |
|---|---|---|---|---|---|
| 2-206 | 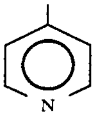 | $-CH_3$ | $-CH_3$ | $-OCH_3$ | H |
| 2-207 | 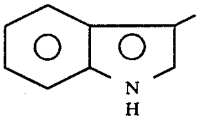 | $-CH_3$ | $-CH_3$ | $-OCH_3$ | H |
| 2-208 | 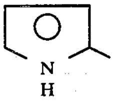 | $-CH_3$ | $-CH_3$ | $-OCH_3$ | H |
| 2-209 | 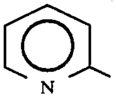 | $-CH_3$ | $-CH_3$ | Cl | H |
| 2-210 | 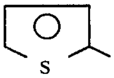 | $-CH_3$ | $-CH_3$ | H | Cl |
| 2-211 | 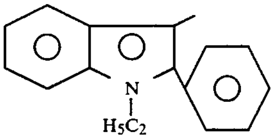 | $-C_2H_5$ | $-C_2H_5$ | $-CH_3$ | H |
| 2-212 | 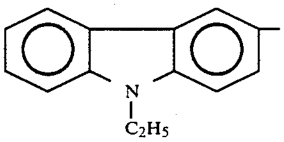 | $-C_2H_5$ | $-C_2H_5$ | $-CH_3$ | H |
TABLE 8
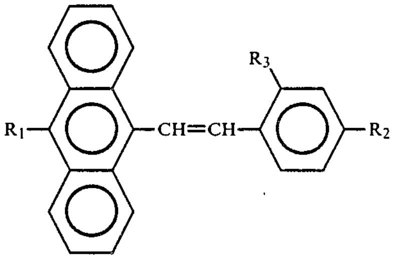
| Compound No. | $R_1$ | $R_2$ | $R_3$ |
|---|---|---|---|
| 2-213 | H | 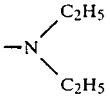 | H |
| 2-214 | Br | $-OCH_3$ | H |
TABLE 8-continued
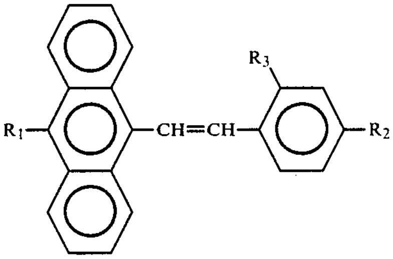
| Compound No. | $R_1$ | $R_2$ | $R_3$ |
|---|---|---|---|
| 2-215 | Br | 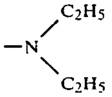 | H |
| 2-216 | H | 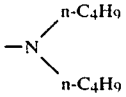 | H |

TABLE 8-continued
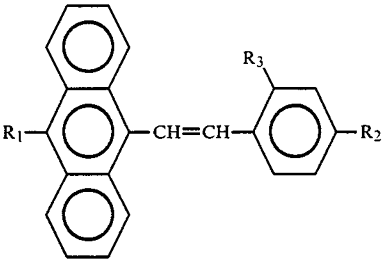
| Compound No. | $R_1$ | $R_2$ | $R_3$ |
|---|---|---|---|
| 2-217 | H | H | H |
| 2-218 | H | $-NO_2$ | H |
| 2-219 | H | $-CH_3$ | H |
| 2-220 | H | $-CN$ | H |
| 2-221 | H | 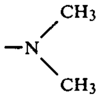 | H |
| 2-222 | H | Cl | H |
| 2-223 | H | 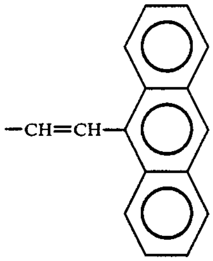 | H |
| 2-224 | H | 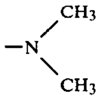 | $-CH_3$ |
TABLE 8-continued
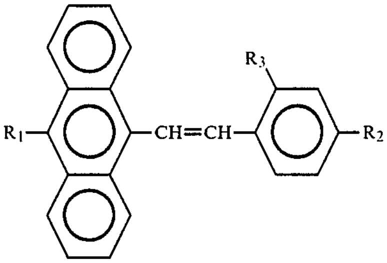
| Compound No. | $R_1$ | $R_2$ | $R_3$ |
|---|---|---|---|
| 2-225 | H | 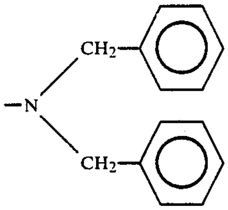 | H |
| 2-226 | H | 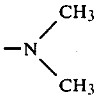 | Cl |
| 2-227 | H | 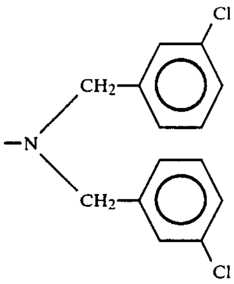 | H |
TABLE 9
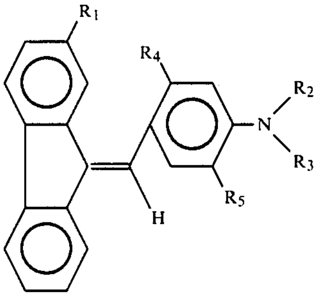
| Compound No. | $R_1$ | $R_2$ | $R_3$ | $R_4$ | $R_5$ |
|---|---|---|---|---|---|
| 2-228 | H | 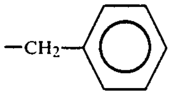 | H | H | H |
| 2-229 | H | 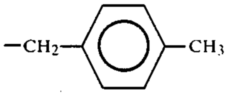 | H | H | H |

TABLE 9-continued
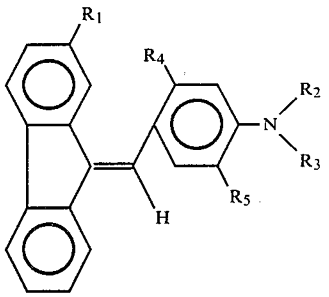
| Compound No. | $R_1$ | $R_2$ | $R_3$ | $R_4$ | $R_5$ |
|---|---|---|---|---|---|
| 2-230 | $-OCH_3$ | $-C_2H_5$ | 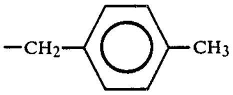 | H | H |
| 2-231 | $-OCH_3$ | $-C_2H_5$ | 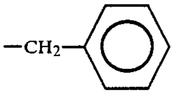 | $-OCH_3$ | H |
| 2-232 | H | $-n\text{-}C_3H_7$ | 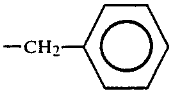 | $-OCH_3$ | H |
| 2-233 | H | $-C_2H_5$ | 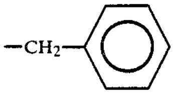 | H | H |
| 2-234 | Br | $-CH_3$ | 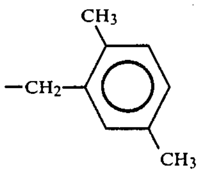 | H | H |
| 2-235 | H | $-CH_3$ | 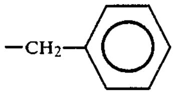 | H | $-CH_3$ |
| 2-236 | H | $-CH_3$ | 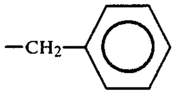 | Cl | H |
| 2-237 | H | $-C_2H_4Cl$ | 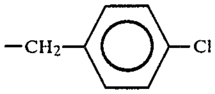 | H | H |
| 2-238 | H | $-C_2H_4Cl$ | 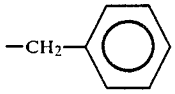 | H | H |
| 2-239 | H | $-C_2H_4Cl$ | 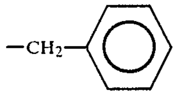 | H | H |

TABLE 9-continued
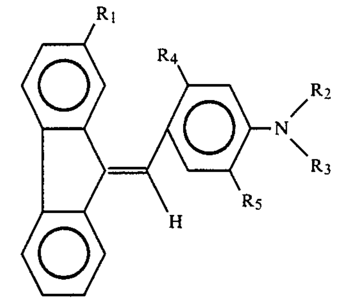
| Compound No. | $R_1$ | $R_2$ | $R_3$ | $R_4$ | $R_5$ |
|---|---|---|---|---|---|
| 2-240 | $-CN$ | $-C_2H_4OH$ | 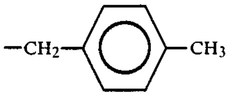 | H | H |
| 2-241 | $-CH_3$ | 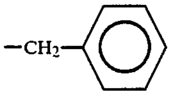 | 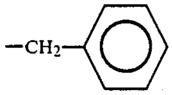 | H | H |
| 2-242 | $-CH_3$ | 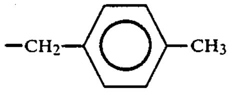 | 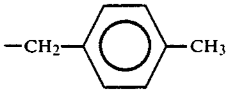 | H | H |
| 2-243 | H | 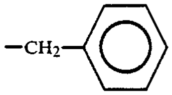 | 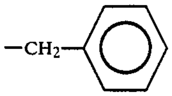 | $-OCH_3$ | H |
| 2-244 | $-CN$ | 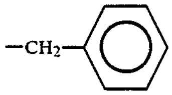 | 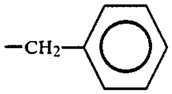 | $-OCH_3$ | H |
| 2-245 | H | 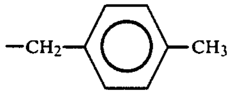 | 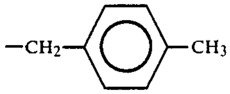 | H | $-CH_3$ |
| 2-246 | H | 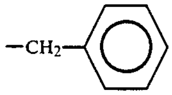 | 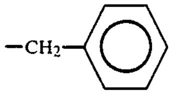 | 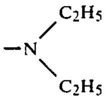 | H |
| 2-247 | H | 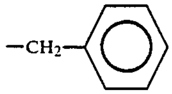 | 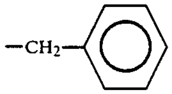 | $-CH_3$ | $-CH_3$ |
| 2-248 | Br | 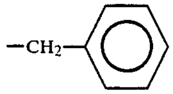 | 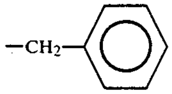 | $-C_2H_5$ | H |
| 2-249 | H | 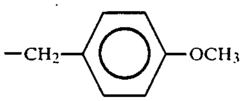 | 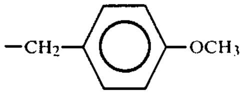 | Cl | H |
| 2-250 | H | 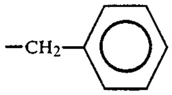 | 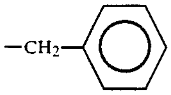 | Cl | $-OCH_3$ |

TABLE 9-continued
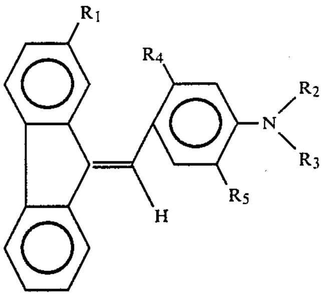
| Compound No. | $R_1$ | $R_2$ | $R_3$ | $R_4$ | $R_5$ |
|---|---|---|---|---|---|
| 2-251 | H | 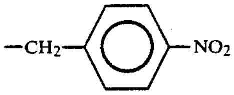 | 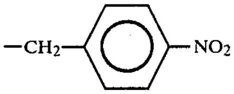 | H | H |
| 2-252 | $-OCH_3$ | 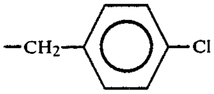 | 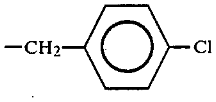 | H | H |
| 2-253 | H | 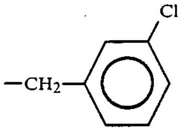 | 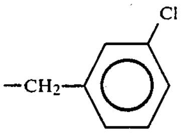 | H | H |
| 2-254 | H | 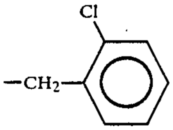 | 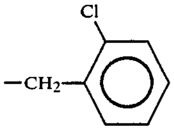 | H | H |
| 2-255 | Br | 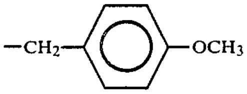 | 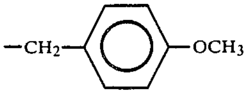 | H | H |
| 2-256 | H | 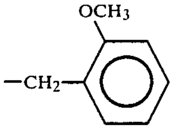 | 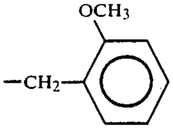 | H | H |
| 2-257 | H | 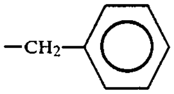 | 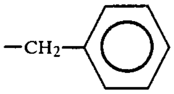 | 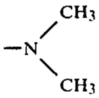 | H |
| 2-258 | H | 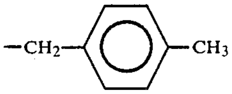 | 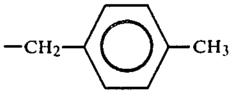 | Cl | $-OCH_3$ |
| 2-259 | H | 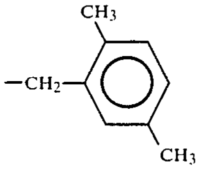 | 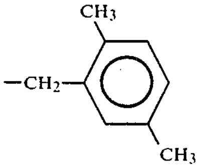 | H | H |

TABLE 9-continued
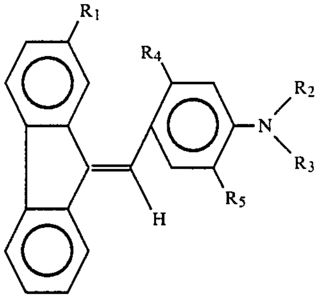
| Compound No. | $R_1$ | $R_2$ | $R_3$ | $R_4$ | $R_5$ |
|---|---|---|---|---|---|
| 2-260 | H | 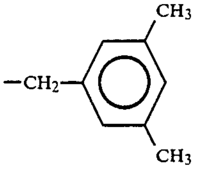 | 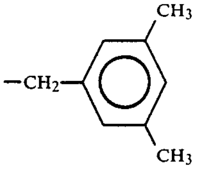 | H | H |
| 2-261 | H | 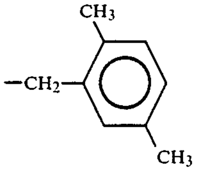 | 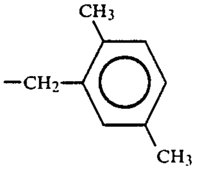 | $-OCH_3$ | H |
| 2-262 | H | 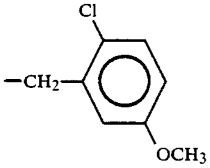 | 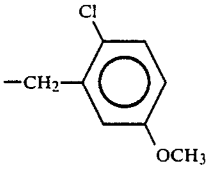 | $-OCH_3$ | H |
| 2-263 | H | 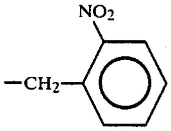 | 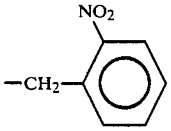 | H | H |
| 2-264 | H | 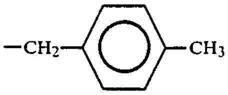 | 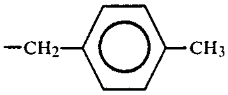 | 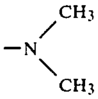 | H |
| 2-265 | H | 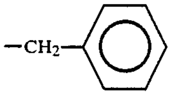 | 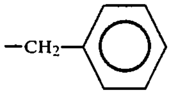 | H | H |
| 2-266 | H | 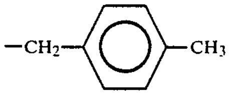 | 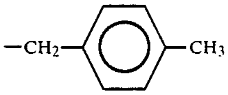 | H | H |
| 2-267 | $-C_2H_5$ | 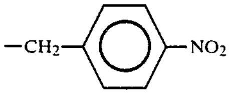 | 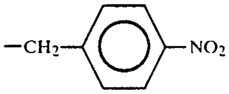 | H | H |
| 2-268 | H | 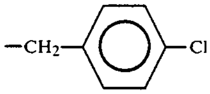 | 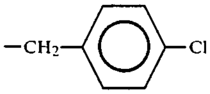 | H | H |

TABLE 9-continued
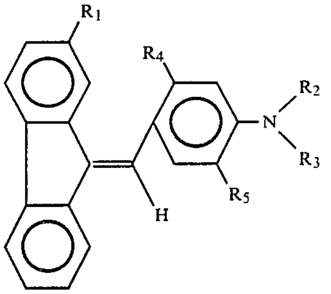
| Compound No. | $R_1$ | $R_2$ | $R_3$ | $R_4$ | $R_5$ |
|---|---|---|---|---|---|
| 2-269 | H | 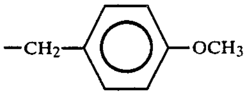 | 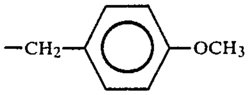 | H | H |
TABLE 10
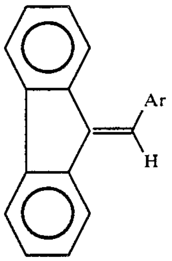
| Compound No. | Ar |
|---|---|
| 2-270 | 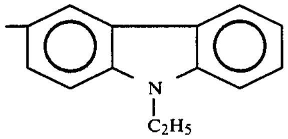 |
TABLE 11
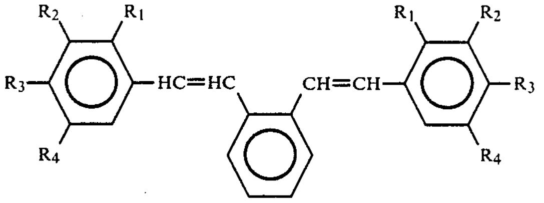
| Compound No. | $R_1$ | $R_2$ | $R_3$ | $R_4$ |
|---|---|---|---|---|
| 2-271 | H | H | Cl | H |
| 2-272 | H | H | 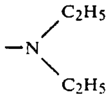 | H |
| 2-273 | $-CH_3$ | H | 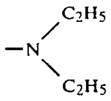 | H |
TABLE 11-continued
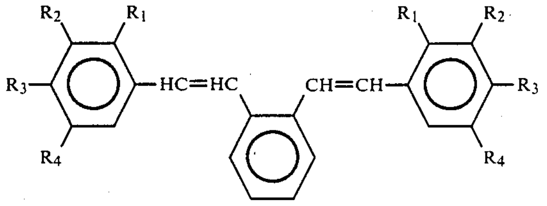
| Compound No. | $R_1$ | $R_2$ | $R_3$ | $R_4$ |
|---|---|---|---|---|
| 2-274 | H | H | 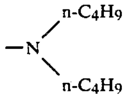 | H |
| 2-275 | Cl | H | 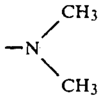 | H |
| 2-276 | H | H | $-CN$ | H |
| 2-277 | H | H | 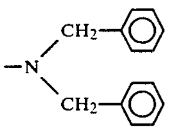 | H |
| 2-278 | H | H | $-CH_3$ | H |
| 2-279 | $-CH_3$ | H | H | H |
| 2-280 | H | H | $-NO_2$ | H |
| 2-281 | H | $-NO_2$ | H | H |
| 2-282 | $-NO_2$ | H | H | H |
| 2-283 | H | H | $-OC_2H_5$ | H |
| 2-284 | H | H | Br | H |
| 2-285 | H | Br | H | H |
| 2-286 | H | H | $-NHCOCH_3$ | H |
| 2-287 | $-NH_2$ | H | H | H |
| 2-288 | H | H | $-NH_2$ | H |
| 2-289 | H | $-NH_2$ | H | H |
| 2-290 | H | H | $-C_2H_5$ | H |
| 2-291 | $-OCH_3$ | H | H | H |
| 2-292 | $-OCH_3$ | H | 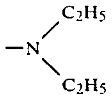 | H |

TABLE 11-continued
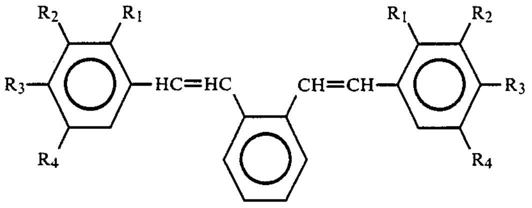
| Compound No. | $R_1$ | $R_2$ | $R_3$ | $R_4$ |
|---|---|---|---|---|
| 2-293 | H | H | $-COOC_2H_5$ | H |
| 2-294 | H | H | $-COOH$ | H |
| 2-295 | H | H | 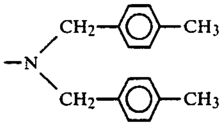 | H |
| 2-296 | H | H | 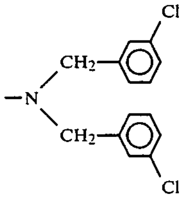 | H |
| 2-297 | H | H | 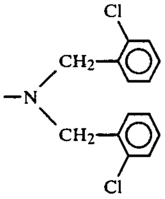 | H |
| 2-298 | H | H | 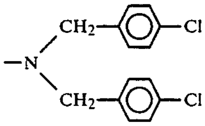 | H |
| 2-299 | Cl | H | 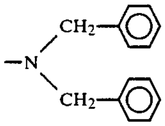 | $-OCH_3$ |
| 2-300 | Cl | H | 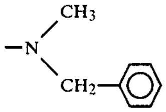 | $-CH_3$ |
| 2-301 | H | H | H | H |
| 2-302 | H | $-OCH_3$ | H | $-OCH_3$ |
| 2-303 | $-OCH_3$ | $-OCH_3$ | $-OCH_3$ | H |
| 2-304 | $-OCH_3$ | H | H | $-OCH_3$ |
| 2-305 | H | H | $-OH$ | H |
| 2-306 | H | H | 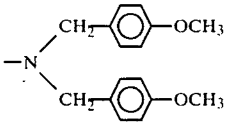 | H |
TABLE 11-continued
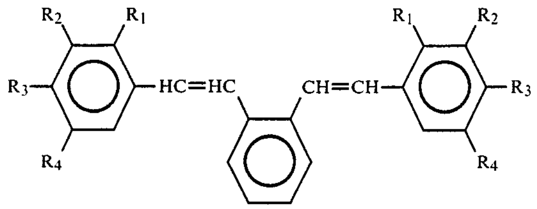
| Compound No. | $R_1$ | $R_2$ | $R_3$ | $R_4$ |
|---|---|---|---|---|
| 2-307 | H | $-CH_3$ | 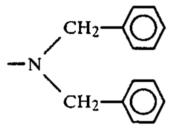 | H |
| 2-308 | H | H | 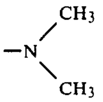 | H |
TABLE 12
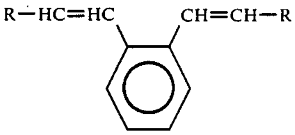
| Compound No. | R |
|---|---|
| 2-309 | 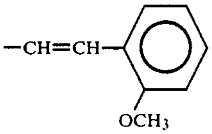 |
| 2-310 | 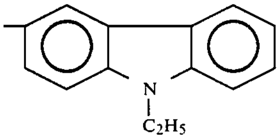 |
| 2-311 | 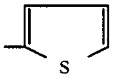 |
| 2-312 | 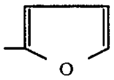 |
| 2-313 | 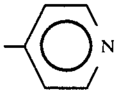 |
| 2-314 | 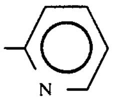 |

TABLE 12-continued

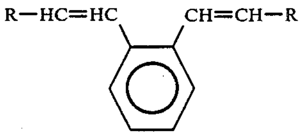

| Compound No. | R |
|---|---|
| 2-315 | 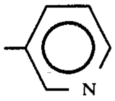 |
| 2-316 | 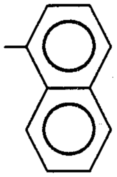 |
| 2-317 | 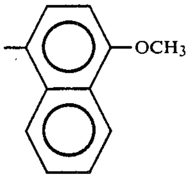 |
| 2-318 | 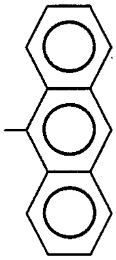 |
| 2-319 | 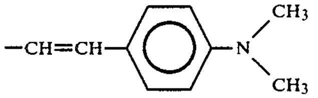 |
| 2-320 | 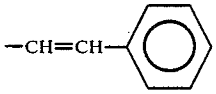 |
| 2-321 | 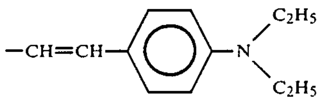 |

TABLE 13

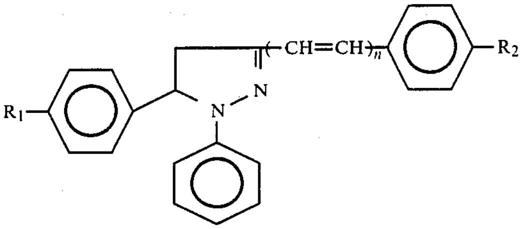

| Compound No. | n | $R_1$ | $R_2$ |
|---|---|---|---|
| 2-322 | 0 | $-N(C_2H_5)_2$ | H |
| 2-323 | 0 | $-N(CH_3)_2$ | H |
| 2-324 | 0 | $-OCH_3$ | H |
| 2-325 | 0 | $-OC_2H_5$ | H |
| 2-326 | 0 | $-CH_3$ | H |
| 2-327 | 1 | $-N(C_2H_5)_2$ | $-N(C_2H_5)_2$ |
| 2-328 | 1 | $-OC_2H_5$ | $-OC_2H_5$ |
| 2-329 | 1 | $-OCH_3$ | $-OCH_3$ |
| 2-330 | 1 | $-CH_3$ | $-CH_3$ |
| 2-331 | 1 | $-N(CH_3)_2$ | $-N(CH_3)_2$ |

In addition to the above enumerated compounds, there can be effectively employed any one of the following known charge transfer substances including the high molecular substances such as poly-N-vinylcarbazole, halogenated-poly-N-vinylcarbazole, polyvinylpyrene or condensation resins such as bromopyrene-formaldehyde condensation resin, N-ethylcarbazole-formaldehyde condensation resin and the like, and the low molecular substances such as oxazole derivatives, oxadiazole derivatives, nitro derivatives of fluorenone and the like.

The binder resins used for the charge carrier generating layer herein include polyester resin, butyral resin, ethyl cellulose resin, epoxy resin, acryl resin, vinylidene chloride resin, polystyrene, polybutadiene and their copolymers. They may be used singly or in the mixed state of two kinds or more.

The binder resins for use in the charge transfer layer include polycarbonate resin, polyester resin, polystyrene, polyurethane resin, epoxy resin, acryl resin, silicone resin and their copolymers. They may be used singly or in the mixed state of two kinds or more.

Further, various additives may be incorporated in the charge transfer layer for the purpose of improving its flexibility or durability. As the additives used for this purpose there can be enumerated halogenated paraffin, dialkyl phthalate, silicone oil and the like. In the case of the element according to the present invention, it is also possible to provide a barrier layer between the electrically conductive substrate and the charge carrier generating layer, an intermediate layer between the charge carrier generating layer and the charge transfer layer, and an overcoat layer on the charge transfer layer as occasion demands.

Still further, the disazo compounds having the general formula (1) of the present invention may be dispersed, taking the powdery form, in the binder resin (which, if needed, may contain the charge transfer substance). That is, said diazo compounds may also be used in a dispersion type element.

The electrophotographic element of the present invention is constructed as mentioned above. Accordingly, as will be evident from examples and comparative examples referred to afterwards, the electrophotographic element of the present invention may be said to have superior properties that it is produced easily as compared with the conventional multilayer type elements, it is high in sensitivity because its visible light wavelengths are localized at the short wavelength region (about 450 to 600 nm), and it is stable in characteristics even when used repeatedly.

Figure 1:
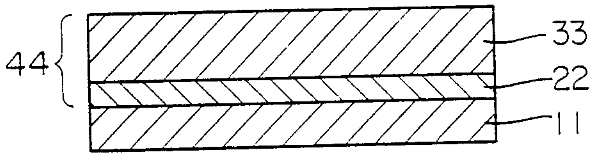
FIG. 1 is a grossly enlarged sectional view of an electrophotographic element embodying the present invention.

11 . . . electrically conductive substrate
22 . . . charge carrier generating layer
33 . . . charge transfer layer
44 . . . photosensitive layer

PREFERRED EMBODIMENTS OF THE INVENTION

Next, the present invention will be explained substantially with reference to examples. However, it is to be understood that the embodiments of the present invention should not be limited thereto.

First, the preparation example of the disazo compound according to the present invention will be given as follows.

Preparation Example

A solution dissolved 9.0 g of sodium nitrite in 30 ml of water was dropped in a mixture of 14.3 g (0.06 mol) of 2,6-diaminoanthraquinone (produced by Aldrich Chemical Co., Milwakee) and 155 ml of 36% hydrochloric acid at a temperature of −5° C. to 0° C. for about 20 minutes. After completion of said dropping, said mixture was stirred at the same temperature for additional 2 hours. Thereafter, 3 l of cold water was poured thereinto, followed by filtration to remove a small amount of insoluble matter therefrom. And, 40 ml of 42% borofluoric acid were added to the filtrate. The separated crystals were filtered out, washed with about 50 ml of methanol and dried, thereby obtaining 22.6 g (Yield: 86.3%) of anthraquinone-2,6-bisdiazoniumbistetrafluoroborate.

Infrared absorption spectrum (KBr tablet method)

| | |
|---|---|
| $\nu N_2$ | 2310 $cm^{-1}$ |
| $\nu Co$ | 1695 $cm^{-1}$ |

Successively, 2.18 g of the thus obtained tetrazonium salt and 0.01 mol of the coupler having the general formula (4) were dissolved in 300 ml of DMF. Then, a solution dissolved 1.64 g of sodium acetate in 14 ml of water was dropped thereinto at room temperature for about 15 minutes. After completion of said dropping, it was stirred for additional 2 hours, and then separated crystals were filtered out. The resulting coarse crystal cake was dispersed in 300 ml of DMF and was stirred at 80° C. for 2 hours. Thereafter, crystals were again filtered out therefrom. This operation was repeated two times additionally. Then, the filtered crystals were washed with water and dried, thereby obtaining the disazo compound according to the present invention. The examaples of the disazo compounds synthesized according to the above mentioned preparation example will be shown Table 14 and Table 15.

TABLE 14

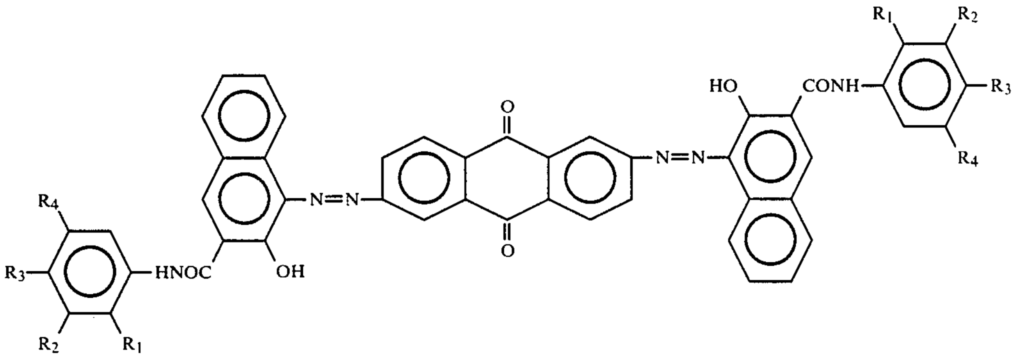

| Compound No. | $R_1$ | $R_2$ | $R_3$ | $R_4$ | Elementary analysis value (calculated value) C % | H % | N % | Melting point (°C.) | Infrared absorption spectrum (KBr disc) $\nu NH(cm^{-1})$ | $\nu CO(cm^{-1})$ |
|---|---|---|---|---|---|---|---|---|---|---|
| 1-1 | $-OCH_3$ | H | H | H | 70.79 (70.91) | 3.93 (4.05) | 9.69 (9.93) | >300 | 3250 | 1673 |
| 1-2 | H | $-OCH_3$ | H | H | 70.58 (70.91) | 3.86 (4.05) | 9.57 (9.93) | >300 | 3260 | 1673 |

TABLE 14-continued

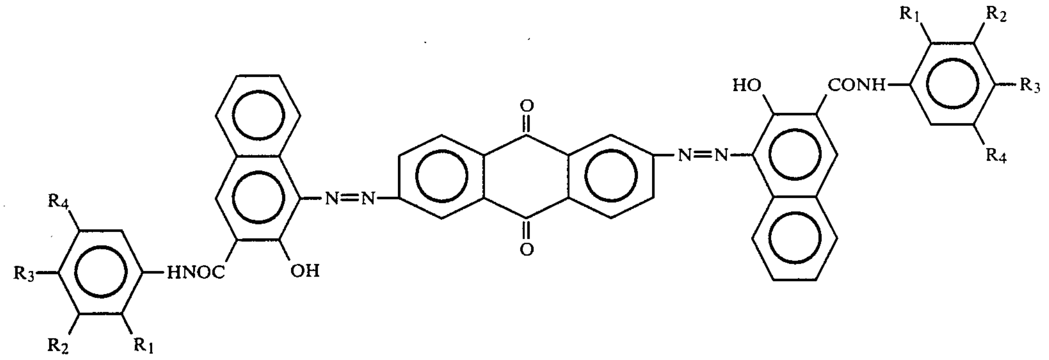

| Compound No. | $R_1$ | $R_2$ | $R_3$ | $R_4$ | Elementary analysis value (calculated value) C % | H % | N % | Melting point (°C.) | Infrared absorption spectrum (KBr disc) νNH(cm$^{-1}$) | νCO(cm$^{-1}$) |
|---|---|---|---|---|---|---|---|---|---|---|
| 1-3 | H | H | $-OCH_3$ | H | 70.63 (70.91) | 3.83 (4.05) | 9.57 (9.93) | >300 | 3300 | 1673 |
| 1-7 | $-CH_3$ | H | H | H | 73.40 (73.70) | 4.01 (4.21) | 10.01 (10.31) | >300 | 3250 | 1673 |
| 1-8 | H | $-CH_3$ | H | H | 73.41 (73.70) | 4.04 (4.21) | 10.27 (10.31) | >300 | 3250 | 1670 |
| 1-9 | H | H | $-CH_3$ | H | 73.42 (73.70) | 4.08 (4.21) | 10.03 (10.31) | >300 | 3240 | 1670 |
| 1-13 | H | H | H | H | 72.99 (73.27) | 3.63 (3.84) | 10.31 (10.68) | >300 | 3250 | 1670 |
| 1-14 | Cl | H | H | H | 67.38 (67.37) | 3.01 (3.30) | 9.65 (9.82) | >300 | 3225 | 1675 |
| 1-15 | H | Cl | H | H | 67.39 (67.37) | 3.26 (3.30) | 9.64 (9.82) | >300 | 3250 | 1675 |
| 1-16 | H | H | Cl | H | 66.98 (67.37) | 3.02 (3.30) | 9.66 (9.82) | >300 | 3250 | 1675 |
| 1-17 | Br | H | H | H | 60.71 (61.03) | 2.84 (2.99) | 8.77 (8.90) | >300 | 3200 | 1670 |
| 1-18 | H | Br | H | H | 60.92 (61.03) | 2.83 (2.99) | 8.74 (8.90) | >300 | 3250 | 1670 |
| 1-19 | H | H | Br | H | 60.98 (61.03) | 2.94 (2.99) | 8.58 (8.90) | >300 | 3250 | 1675 |
| 1-29 | $-CN$ | H | H | H | 71.55 (71.76) | 3.24 (3.37) | 13.30 (13.40) | >300 | — | 1675 |
| 1-30 | H | $-CN$ | H | H | 71.33 (71.76) | 3.19 (3.37) | 13.00 (13.40) | >300 | 3230 | 1675 |
| 1-31 | H | H | $-CN$ | H | 71.21 (71.76) | 3.34 (3.37) | 13.25 (13.40) | >300 | 3250 | 1675 |
| 1-26 | $-CF_3$ | H | H | H | 64.89 (65.08) | 2.88 (3.05) | 8.91 (9.11) | >300 | 3260 | 1680 |
| 1-27 | H | $-CF_3$ | H | H | 65.20 (65.08) | 2.73 (3.05) | 9.21 (9.11) | >300 | 3260 | 1675 |
| 1-28 | H | H | $-CF_3$ | H | 65.21 (65.08) | 3.00 (3.05) | 9.03 (9.11) | >300 | 3250 | 1670 |
| 1-32 | $-NO_2$ | H | H | H | 65.85 (65.75) | 3.14 (3.22) | 12.46 (12.78) | >300 | 3200 | 1675 |
| 1-33 | H | $-NO_2$ | H | H | 65.32 (65.75) | 3.14 (3.22) | 12.55 (12.78) | >300 | 3200 | 1675 |
| 1-34 | H | H | $-NO_2$ | H | 65.51 (65.75) | 3.26 (3.22) | 12.48 (12.78) | >300 | 3200 | 1675 |
| 1-41 | Cl | H | H | Cl | 62.06 (62.35) | 2.66 (2.84) | 8.96 (9.09) | >300 | 3220 | 1675 |
| 1-42 | $-CH_3$ | H | H | Cl | 67.77 (67.95) | 3.36 (3.65) | 9.24 (9.51) | >300 | 3250 | 1670 |
| 1-45 | $-CH_3$ | H | Cl | H | 67.47 (67.95) | 3.35 (3.65) | 9.31 (9.51) | >300 | 3250 | 1675 |
| 1-46 | $-NO_2$ | H | $-OCH_3$ | H | 63.81 (64.10) | 3.35 (3.44) | 11.76 (11.96) | >300 | 3200 | 1675 |
| 1-38 | $-OCH_3$ | H | Cl | $-OCH_3$ | 63.83 (64.00) | 3.55 (3.72) | 8.47 (8.61) | >300 | 3250 | 1670 |
| 1-43 | $-OCH_3$ | H | $-OCH_3$ | Cl | 63.68 (64.00) | 3.69 (3.72) | 8.33 (8.61) | >300 | 3250 | 1670 |

TABLE 15
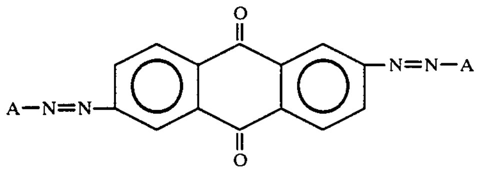
| Compound No. | A | Elementary analysis value (calculated value) C % | H % | N % | Melting point (°C.) | Infrared absorption spectrum (KBr disc) νNH($cm^{-1}$) | νCO($cm^{-1}$) |
|---|---|---|---|---|---|---|---|
| 1-56 | 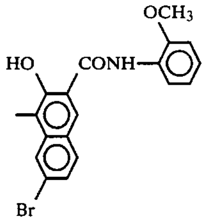 | 59.57 (59.77) | 3.27 (3.21) | 8.37 (8.37) | >300 | 3250 | 1670 |
| 1-57 | 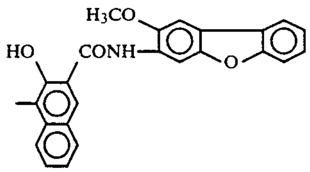 | 72.27 (72.51) | 3.48 (3.73) | 7.96 (8.18) | >300 | 3240 | 1670 |
| 1-58 | 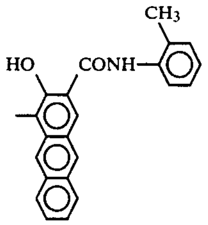 | 75.88 (76.13) | 3.98 (4.19) | 8.98 (9.19) | >300 | 3260 | 1675 |
| 1-59 | 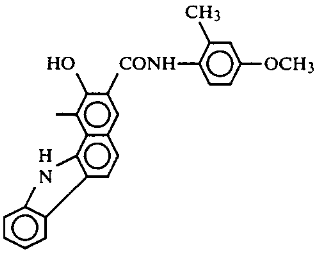 | 72.83 (72.99) | 3.98 (4.21) | 10.34 (10.64) | >300 | 3275 3450 | 1670 |
| 1-60 | 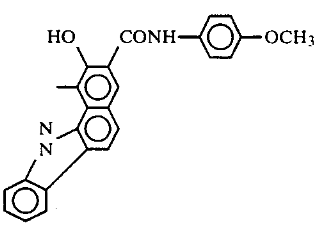 | 72.45 (72.65) | 3.79 (3.93) | 10.58 (10.93) | >300 | 3300 3460 | 1670 |

TABLE 15-continued

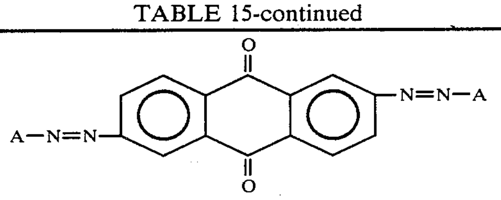

| Compound No. | A | Elementary analysis value (calculated value) C % | H % | N % | Melting point (°C.) | Infrared absorption spectrum (KBr disc) νNH(cm⁻¹) | νCO(cm⁻¹) |
|---|---|---|---|---|---|---|---|
| 1-62 | 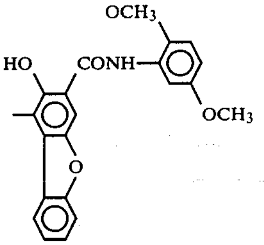 | 67.99 (68.15) | 3.69 (3.88) | 8.41 (8.52) | >300 | 3250 | 1670 |

These novel disazo compounds take the form of red or reddish purple powder at room temperature. FIG. 2 to FIG. 15 indicate infrared absorption spectrums (KBr tablet method) of the typical disazo compounds according to the present invention.

Figure 2:
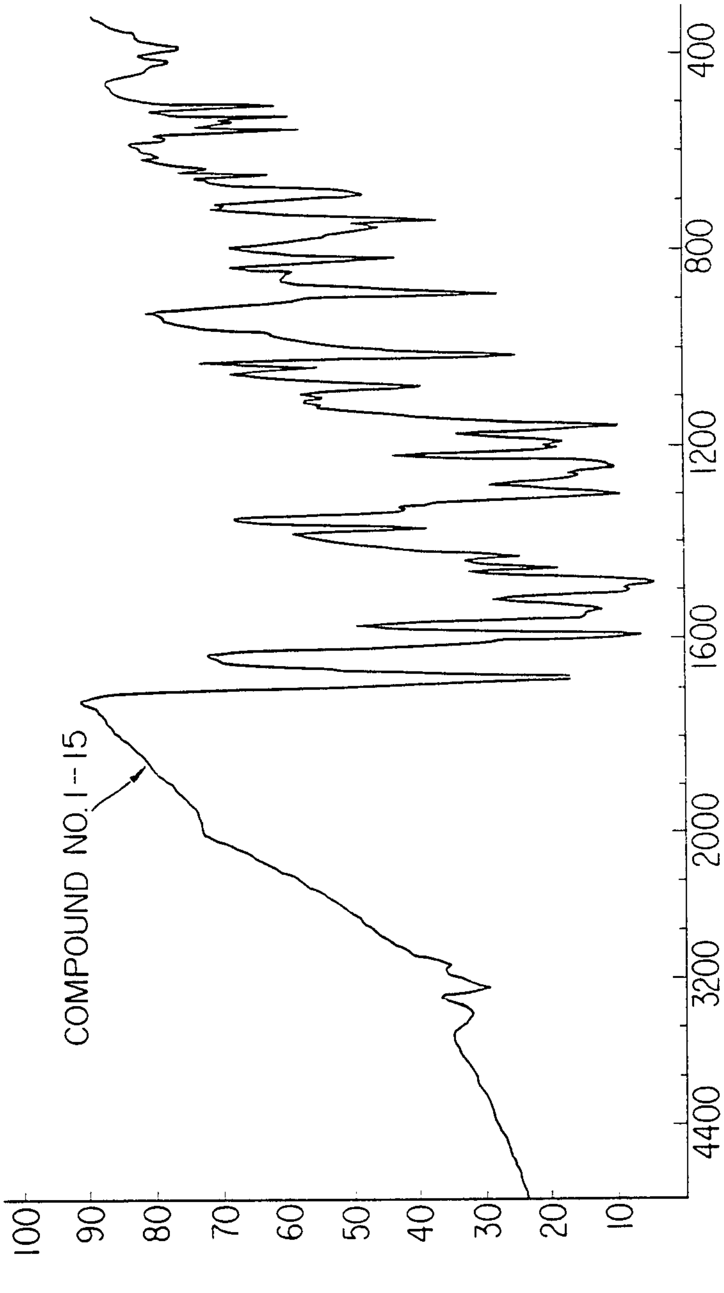
FIGS. 2 to 15 are views illustrating infrared absorption spectrums (Kbr tablet method) of the typical disazo compounds according to the present invention.
Figure 3:
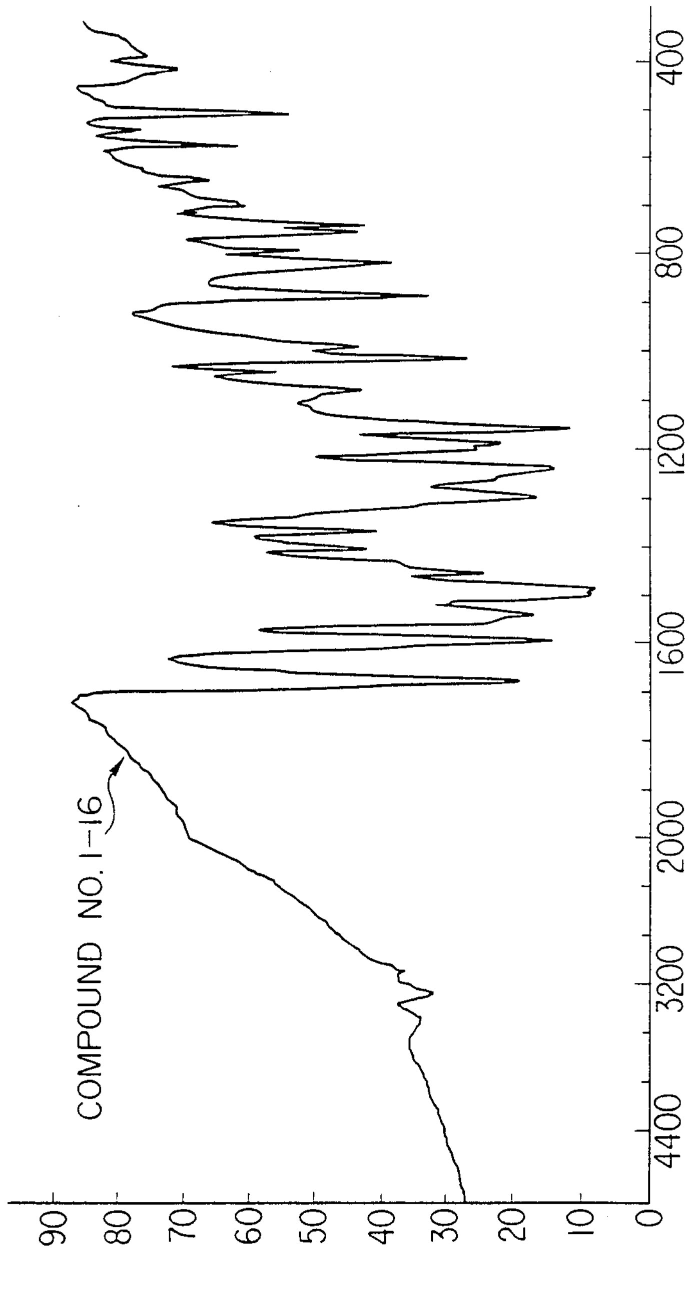
Figure 4:
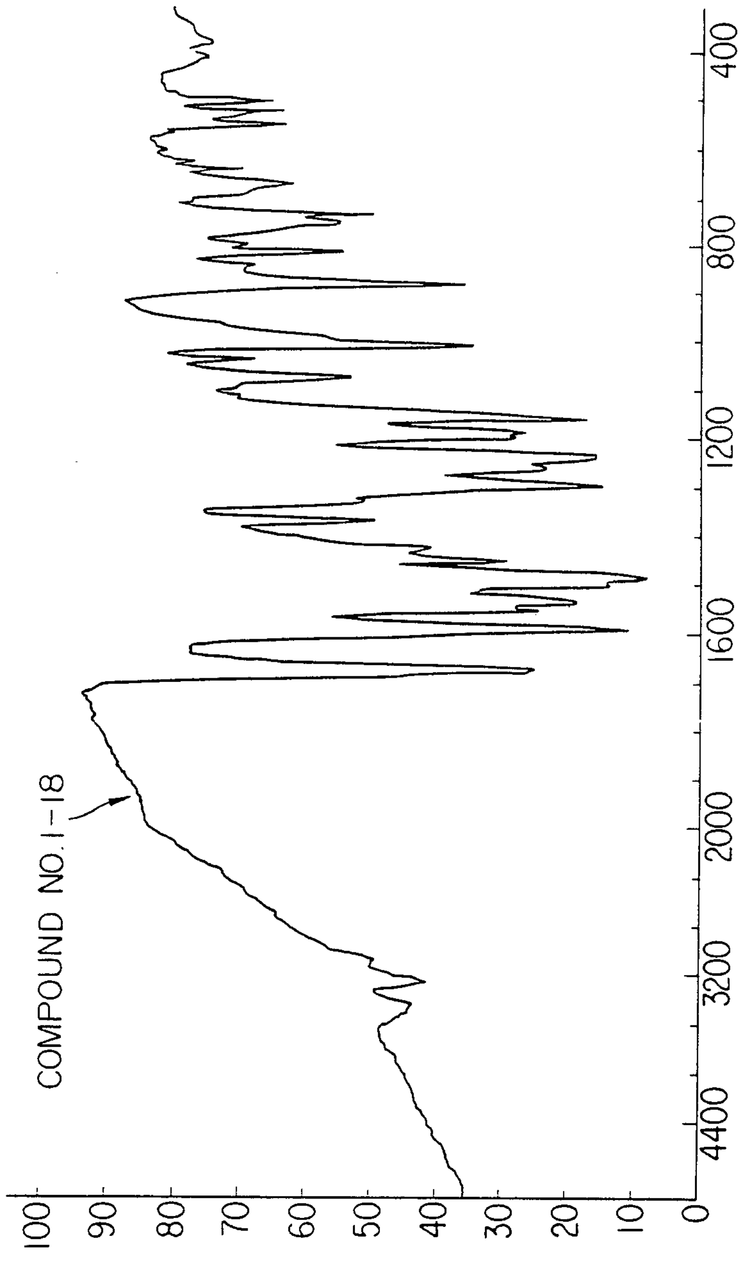
Figure 5:
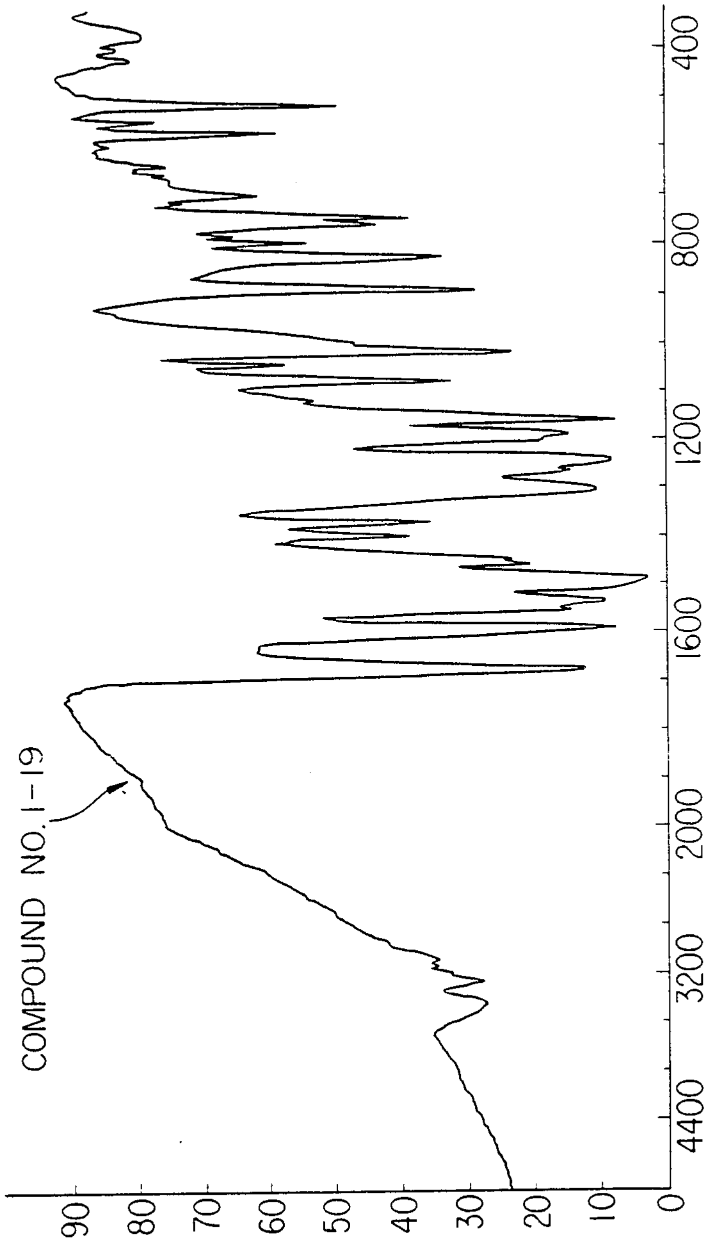
Figure 6:
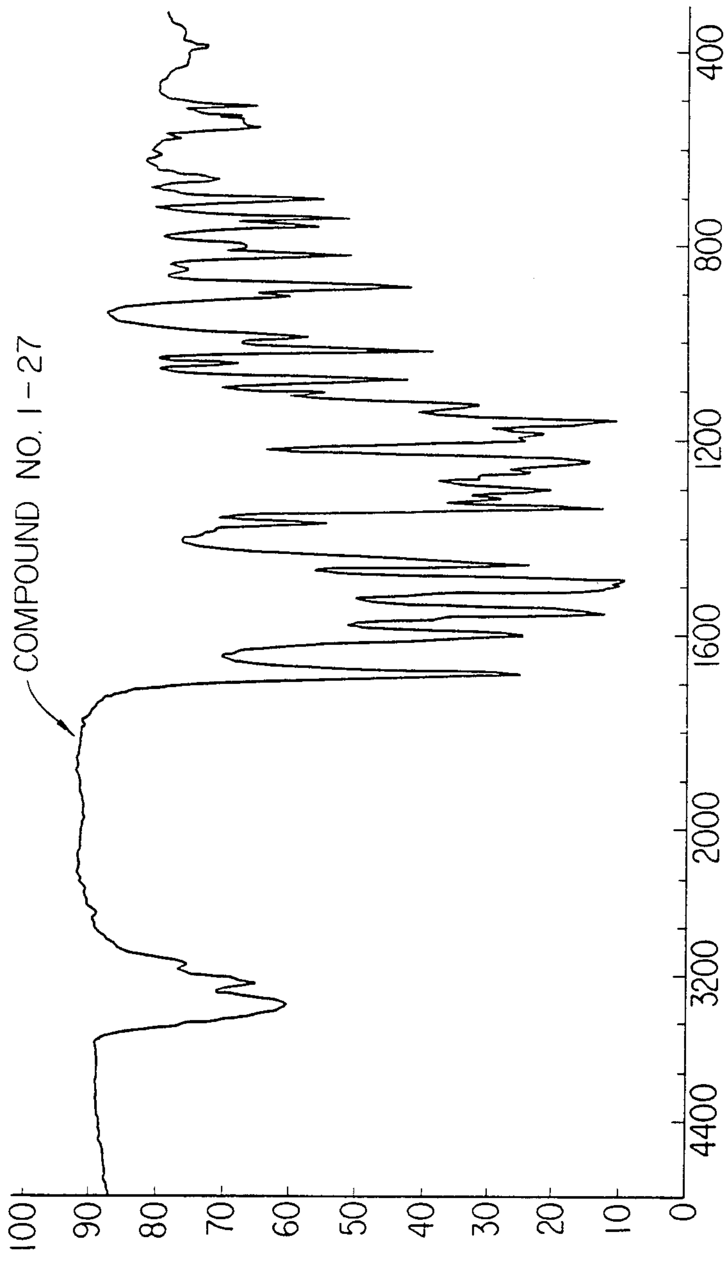
Figure 7:
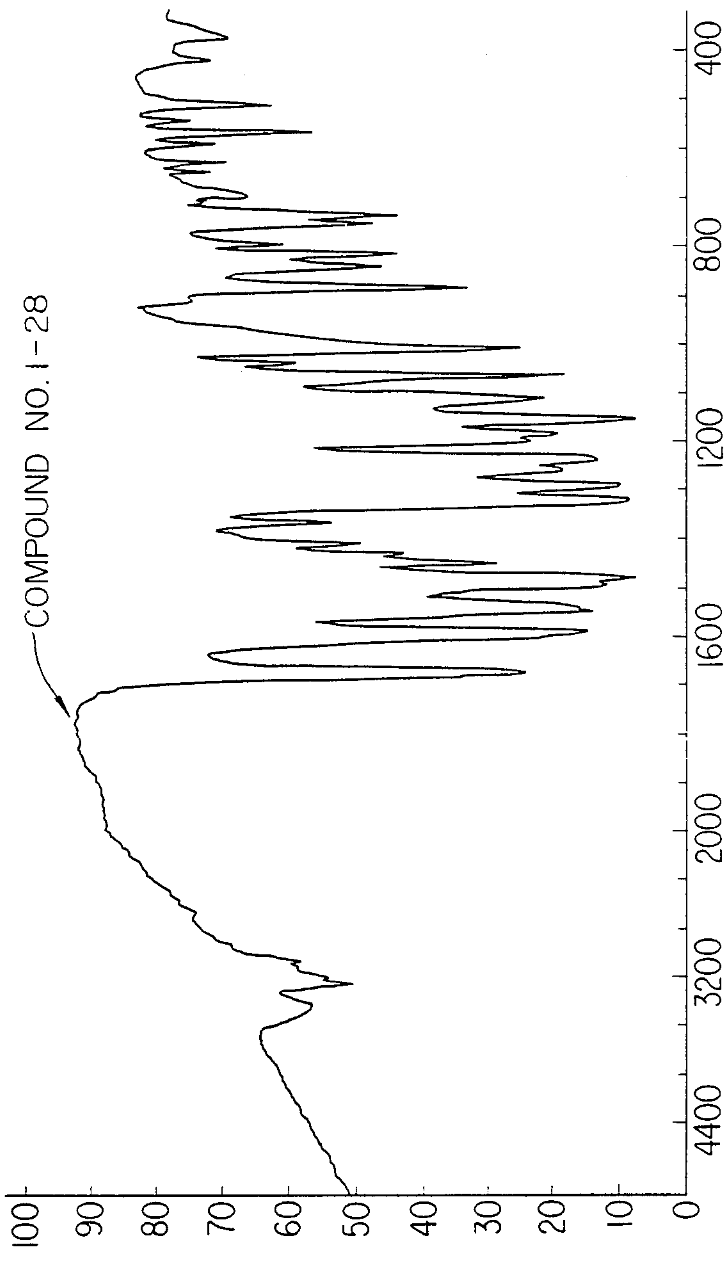
Figure 8:
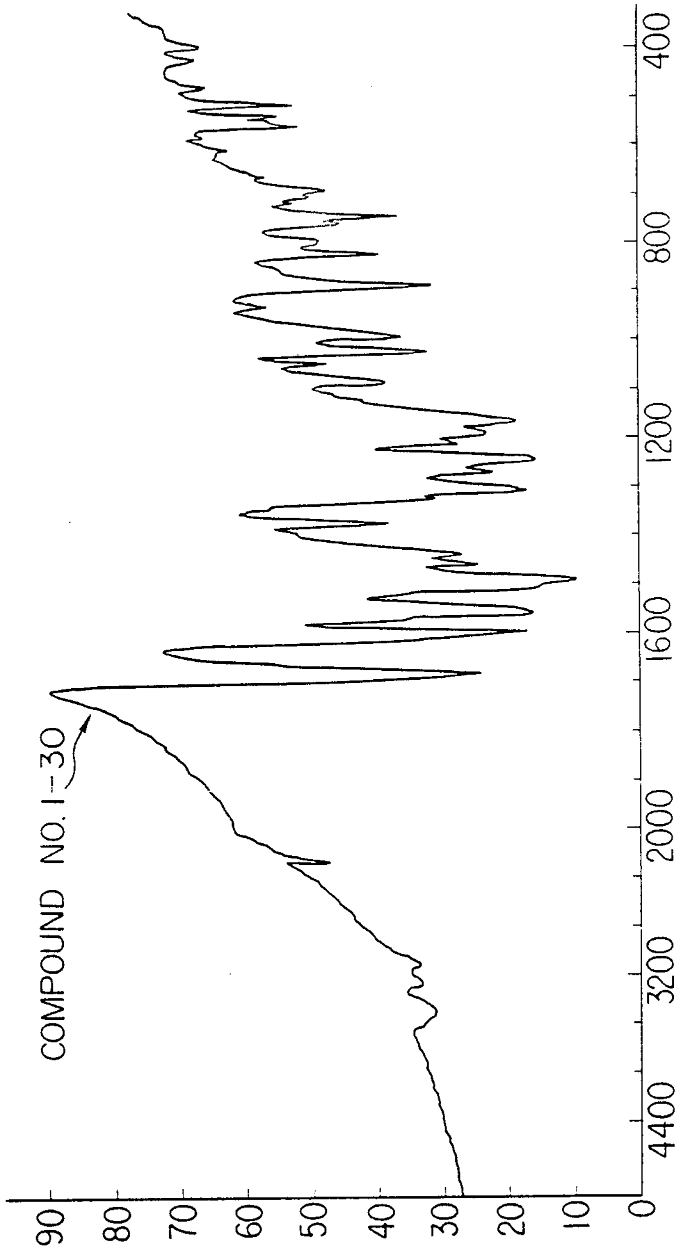
Figure 9:
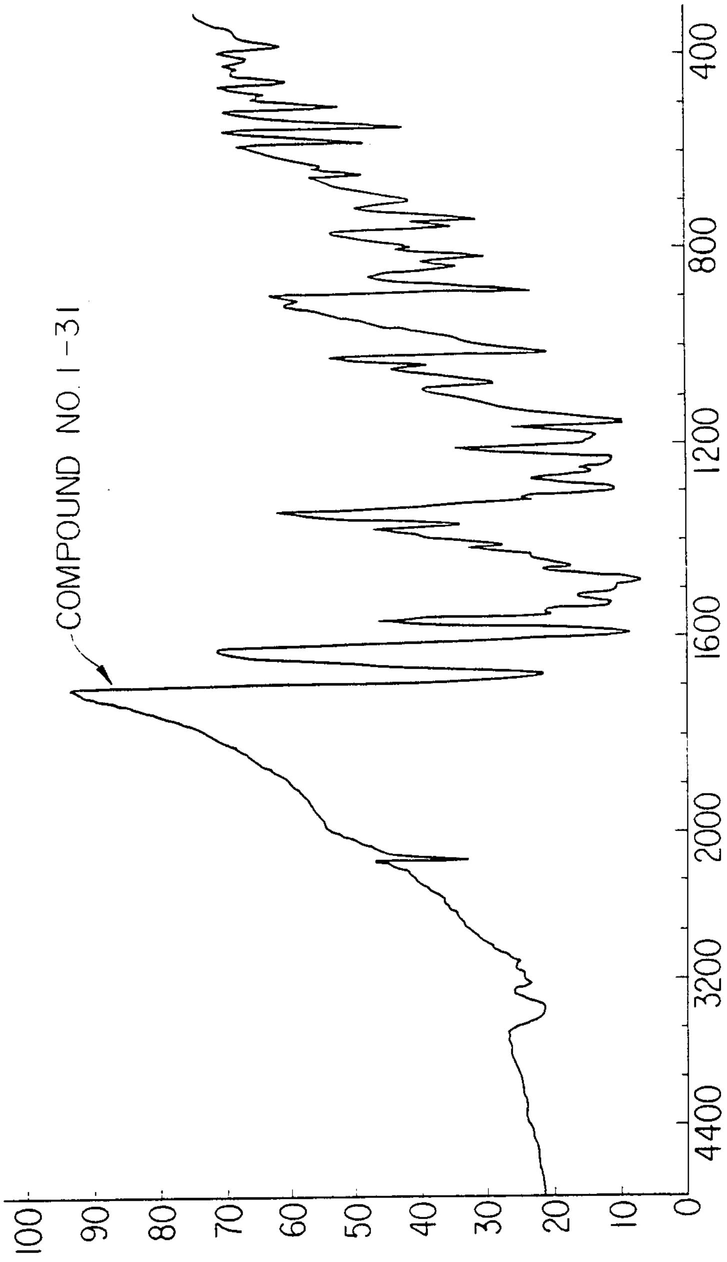
Figure 10:
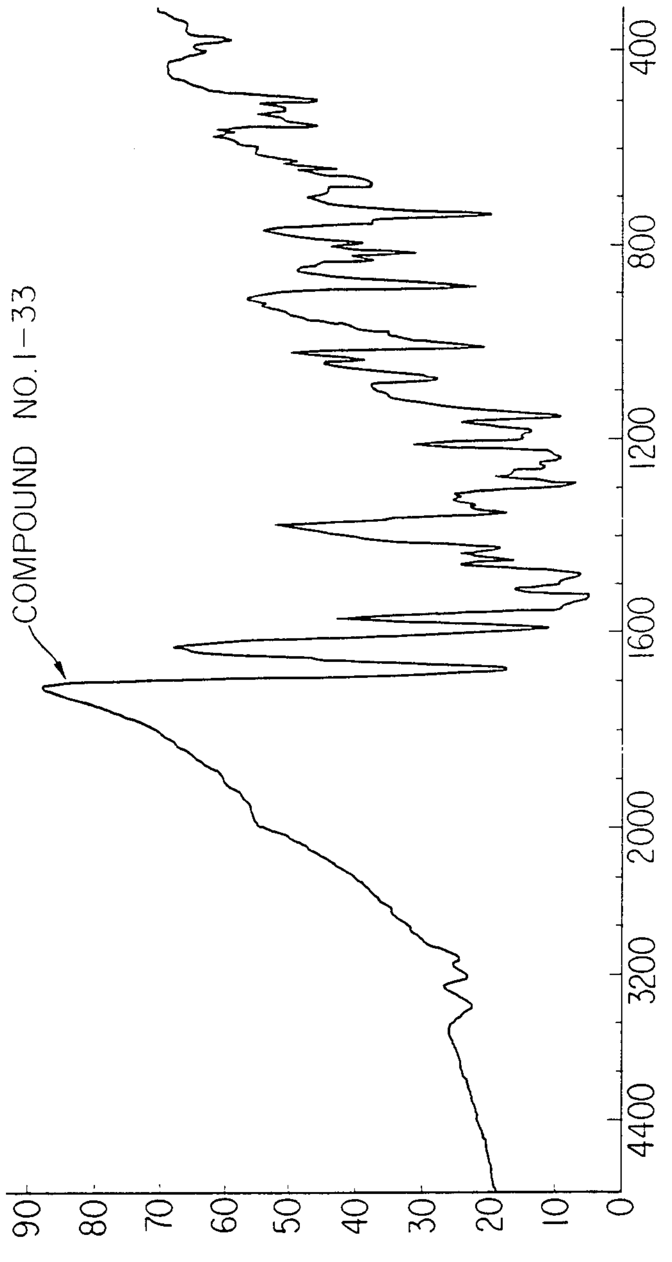
Figure 11:
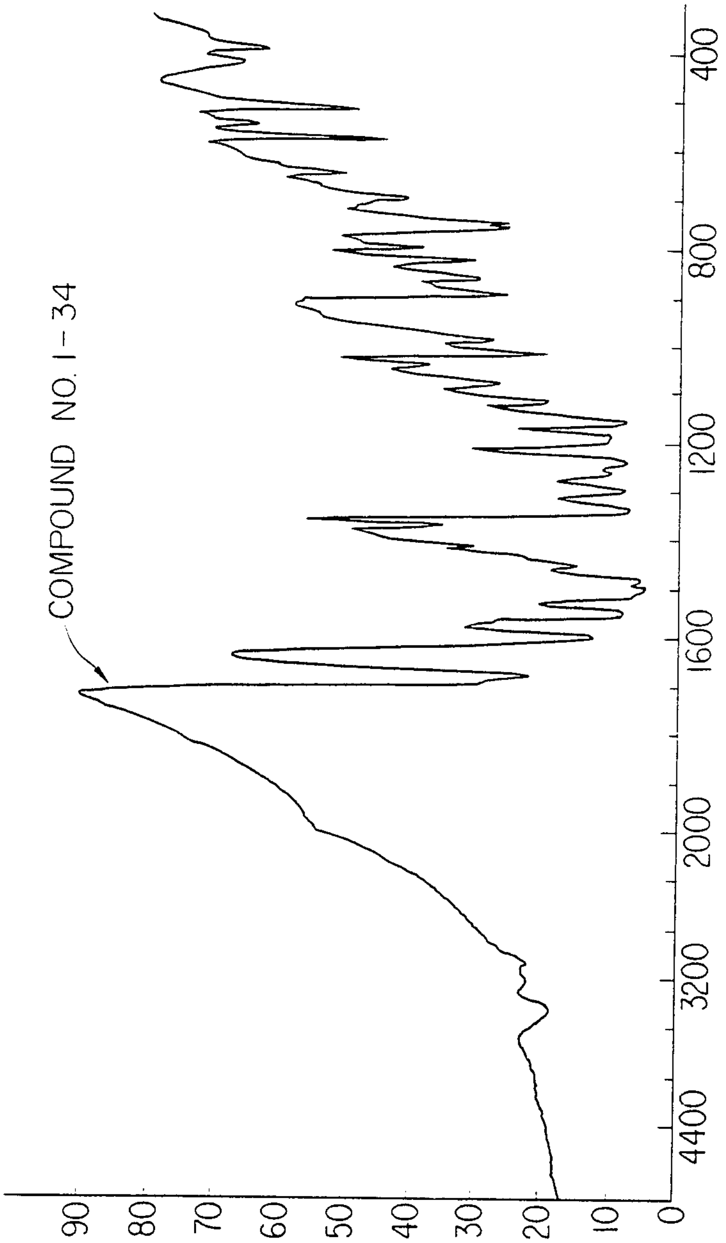
Figure 12:
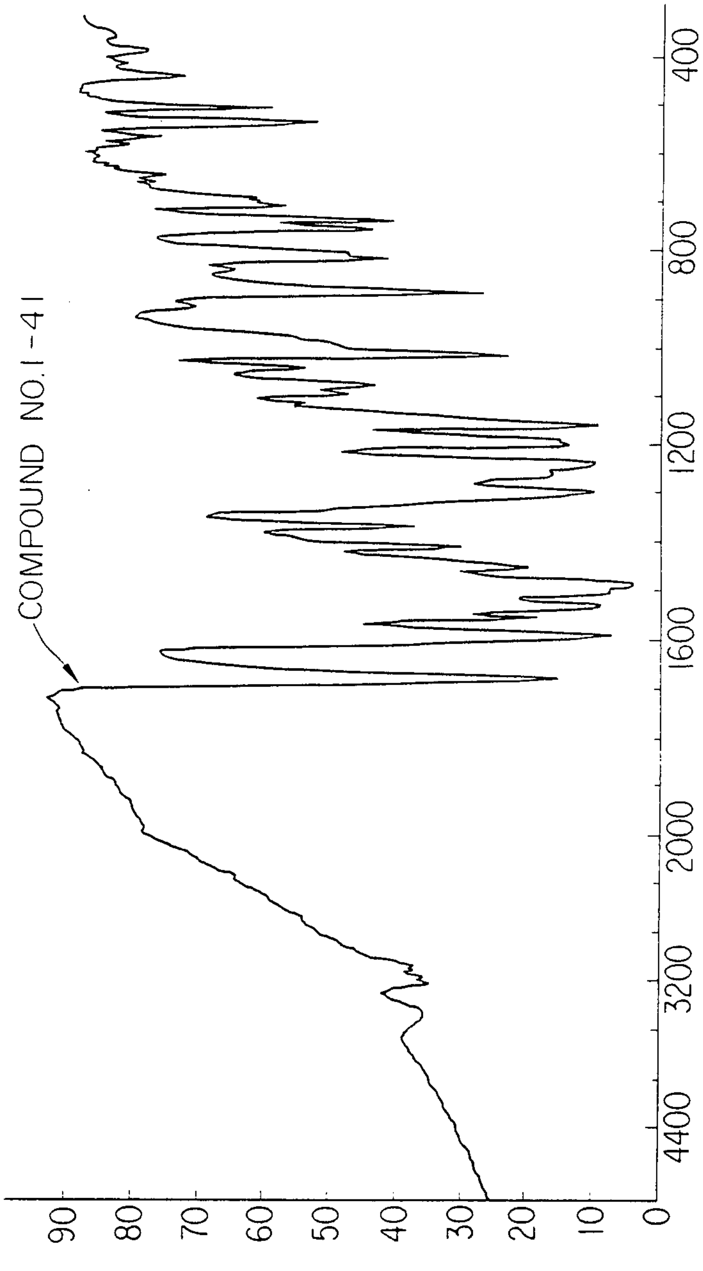
Figure 13:
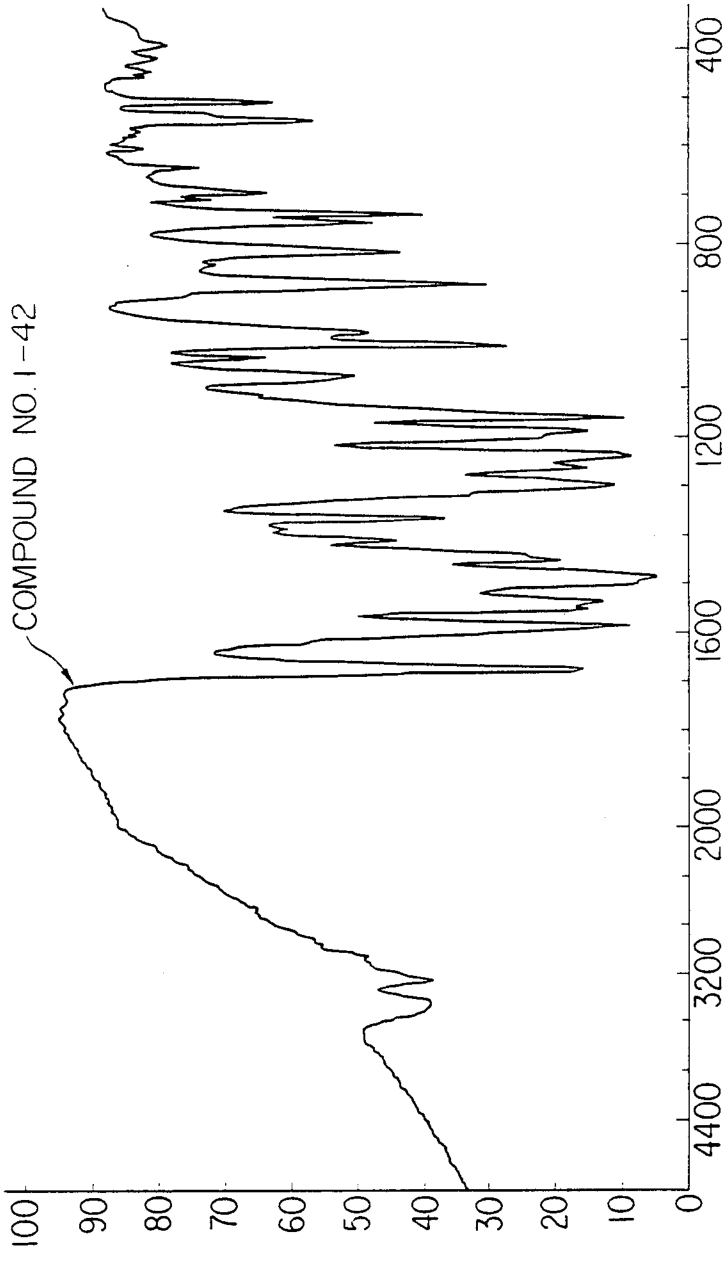
Figure 14:
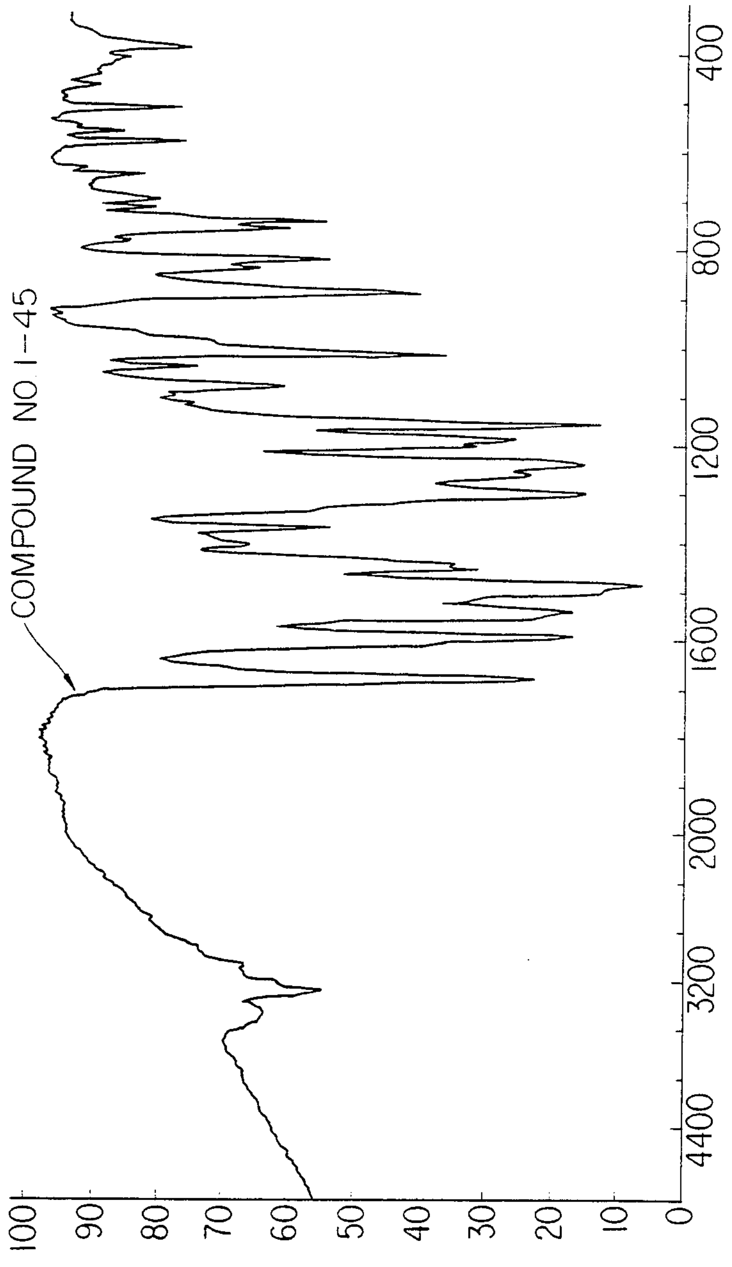
Figure 15:
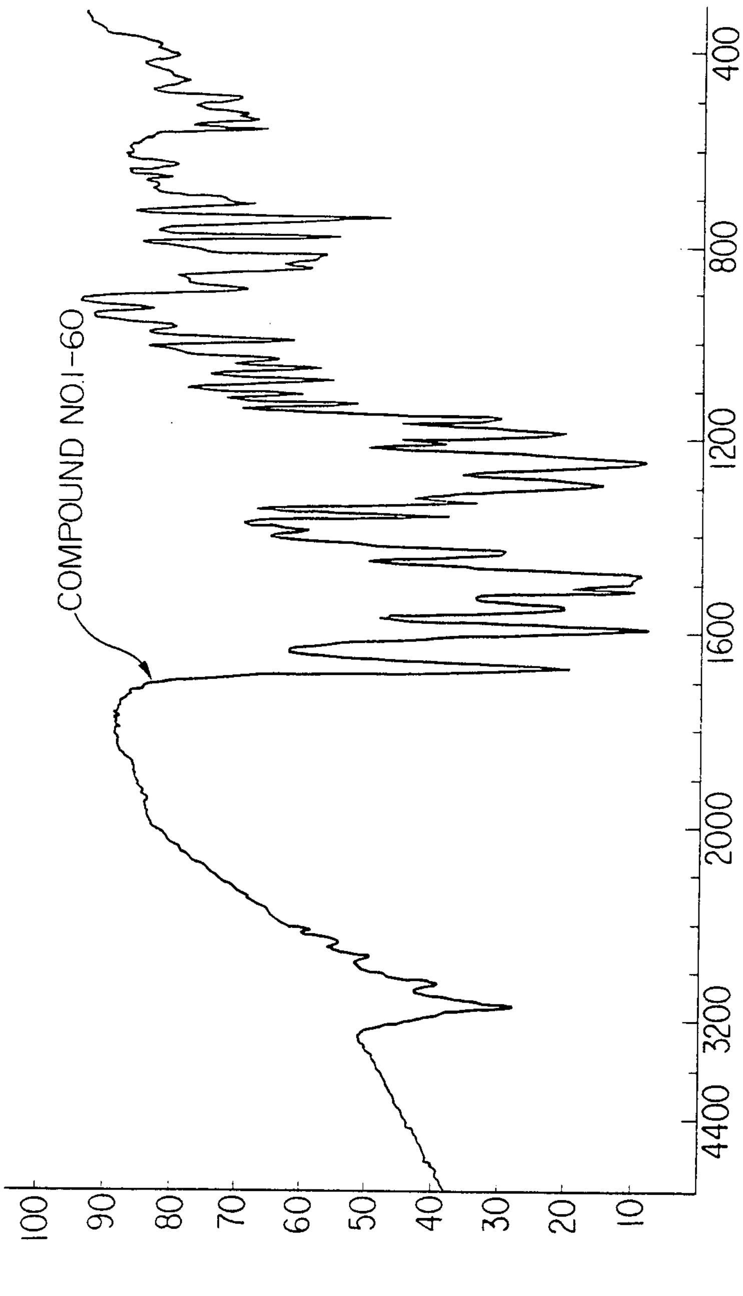

FIG. 2 . . . Compound No. 1-15 FIG. 3 . . . Compound No. 1-16
FIG. 4 . . . Compound No. 1-18 FIG. 5 . . . Compound No. 1-19
FIG. 6 . . . Compound No. 1-27 FIG. 7 . . . Compound No. 1-28
FIG. 8 . . . Compound No. 1-30 FIG. 9 . . . Compound No. 1-31
FIG. 10 . . . Compound No. 1-33 FIG. 11 . . . Compound No. 1-34
FIG. 12 . . . Compound No. 1-41 FIG. 13 . . . Compound No. 1-42
FIG. 14 . . . Compound No. 1-45 FIG. 15 . . . Compound No. 1-60

The disazo compounds according to the present invention, as mentioned above, are effective as the photosensitive material for use in the electrophotographic element, in particular as the charge carrier generating material for use in the multilayer type element. For the purpose of clarifying this point, the concrete use examples will be given hereinafter. For the purpose of clarifying the progress of the present invention, the comparison results of the disazo compounds of the present invention with the conventional disazo compounds will likewise be given hereinafter.

EXAMPLE 1

76 parts by weight of disazo compound No. 1-1, 1260 parts by weight of polyester resin [VYLON 200: produced by TOYO BOSEKI K.K. (solid concentration: 2%) and 3700 parts by weight of tetrahydrofuran were pulverized and mixed in a ball mill. The resulting dispersion was applied onto the aluminum face of an aluminumvapordeposited polyester base (electrically conductive substrate) by means of doctor blade, and same was air-dried to thereby form an about 1 μm-thick charge carrier generating layer.

On the other hand, 2 parts by weight of charge transfer substance No. 2-327, 2 parts by weight of polycarbonate resin (Panlite K˙1300: produced by TEIJIN K.K.) and 16 parts by weight of tetrahydrofuran were mixed and dissolved to obtain a solution. Then, this solution was applied onto said charge carrier generating layer by means of a doctor blade, dried at 80° C. for 2 minutes and then dried at 100° C. for 5 minutes, thereby forming an about 20 μm-thick charge transfer layer. Thus, the multilayer type element No. 1 illustrated in FIG. 1 was prepared.

EXAMPLES 2 TO 69

The exactly same procedure as Example 1 except that the disazo compound No. 1-1 and charge transfer substance No. 2-327 employed in Example 1 were replaced by the disazo compounds and charge transfer substances shown in Table 1 referred to afterwards to thereby prepare Elements No. 2 to 69.

These Elements No. 1 to 69 were subjected to -6 KV corona discharge for 20 seconds by means of an electrostatic copying paper tester (SP 428 TYPE: produced by Kawaguchi Electro Works) and charged negatively. Thereafter, these elements were left standing in the dark for 20 seconds to measure the surface potential Vpo(V) at that time. In succession, said elements were exposed to radiation of light from a tungsten lamp so that the intensity of illumination on their surfaces may be 20 lux. And, the time (second) required until the surface potential was reduced to ½ of Vpo was found out and the exposure amount E½ (lux.sec) was calculated therefrom on each element.

The thus obtained results are shown in Table 16.

TABLE 16

| Element Na | Disazo compound Na | Charge transfer substance Na | Vpo (volt) | E½ (lux · sec) |
|---|---|---|---|---|
| 1 | 1-1 | 2-327 | -472 | 14.2 |
| 2 | 1-2 | 2-327 | -205 | 9.2 |
| 3 | 1-7 | 2-213 | -1038 | 12.4 |
| 4 | 1-7 | 2-327 | -463 | 6.7 |
| 5 | 1-7 | 2-5 | -1182 | 13.8 |
| 6 | 1-8 | 2-327 | -484 | 9.8 |
| 7 | 1-14 | 2-327 | -347 | 8.9 |
| 8 | 1-14 | 2-5 | -1148 | 12.4 |
| 9 | 1-15 | 2-169 | -1195 | 8.1 |
| 10 | 1-15 | 2-213 | -1074 | 6.3 |
| 11 | 1-15 | 2-5 | -1046 | 4.2 |
| 12 | 1-16 | 2-213 | -695 | 6.4 |
| 13 | 1-16 | 2-5 | -571 | 4.5 |

TABLE 16-continued

| Element Na | Disazo compound Na | Charge transfer substance Na | Vpo (volt) | $E_{\frac{1}{2}}$ (lux · sec) |
|---|---|---|---|---|
| 14 | 1-17 | 2-213 | −1159 | 14.1 |
| 15 | 1-17 | 2-327 | −334 | 9.3 |
| 16 | 1-17 | 2-5 | −1208 | 11.6 |
| 17 | 1-18 | 2-169 | −1045 | 7.1 |
| 18 | 1-18 | 2-213 | −1065 | 6.0 |
| 19 | 1-18 | 2-5 | −971 | 3.9 |
| 20 | 1-19 | 2-169 | −1007 | 13.6 |
| 21 | 1-19 | 2-213 | −616 | 8.2 |
| 22 | 1-29 | 2-327 | −706 | 14.7 |
| 23 | 1-29 | 2-5 | −1074 | 9.7 |
| 24 | 1-30 | 2-169 | −1291 | 5.3 |
| 25 | 1-30 | 2-213 | −744 | 4.2 |
| 26 | 1-30 | 2-5 | −744 | 3.2 |
| 27 | 1-31 | 2-169 | −1222 | 9.5 |
| 28 | 1-31 | 2-213 | −435 | 7.5 |
| 29 | 1-31 | 2-5 | −705 | 5.1 |
| 30 | 1-27 | 2-169 | −829 | 9.8 |
| 31 | 1-27 | 2-213 | −623 | 12.6 |
| 32 | 1-27 | 2-327 | −307 | 5.9 |
| 33 | 1-27 | 2-5 | −502 | 10.6 |
| 34 | 1-28 | 2-169 | −1100 | 9.3 |
| 35 | 1-28 | 2-213 | −573 | 9.5 |
| 36 | 1-28 | 2-5 | −954 | 8.5 |
| 37 | 1-32 | 2-213 | −1129 | 10.9 |
| 38 | 1-32 | 2-5 | −1060 | 8.7 |
| 39 | 1-33 | 2-169 | −1098 | 5.3 |
| 40 | 1-33 | 2-213 | −626 | 4.9 |
| 41 | 1-33 | 2-5 | −780 | 3.3 |
| 42 | 1-34 | 2-169 | −1286 | 12.6 |
| 43 | 1-34 | 2-213 | −405 | 7.5 |
| 44 | 1-34 | 2-5 | −433 | 4.7 |
| 45 | 1-45 | 2-169 | −876 | 10.9 |
| 46 | 1-45 | 2-213 | −656 | 10.6 |
| 47 | 1-45 | 2-5 | −690 | 7.5 |
| 48 | 1-42 | 2-213 | −304 | 4.2 |
| 49 | 1-42 | 2-5 | −398 | 3.0 |
| 50 | 1-41 | 2-169 | −1318 | 7.8 |
| 51 | 1-41 | 2.213 | −797 | 6.1 |
| 52 | 1-41 | 2-5 | −905 | 5.4 |
| 53 | 1-46 | 2-327 | −400 | 13.0 |
| 54 | 1-46 | 2-5 | −641 | 9.8 |
| 55 | 1-56 | 2-213 | −487 | 13.4 |
| 56 | 1-56 | 2-5 | −590 | 9.4 |
| 57 | 1-58 | 2-169 | −917 | 12.1 |
| 58 | 1-58 | 2-213 | −667 | 7.4 |
| 59 | 1-58 | 2-5 | −882 | 5.7 |
| 60 | 1-60 | 2-213 | −431 | 3.3 |
| 61 | 1-60 | 2-5 | −520 | 2.8 |
| 62 | 1-59 | 2-213 | −724 | 8.2 |
| 63 | 1-59 | 2-5 | −771 | 10.5 |
| 64 | 1-20 | 2-5 | −1130 | 7.8 |
| 65 | 1-21 | 2-5 | −853 | 4.0 |
| 66 | 1-22 | 2-5 | −481 | 3.8 |
| 67 | 1-23 | 2-5 | −1150 | 8.0 |
| 68 | 1-24 | 2-5 | −1277 | 10.2 |
| 69 | 1-25 | 2-5 | −1105 | 11.0 |

Comparative Example 1

The multilayer type element disclosed in U.S. Pat. No. 3871882, wherein a perylene derivative is incorporated in the charge carrier generating layer and an oxadiazole derivative is incorporated in the charge transfer layer, was prepared in the undermentioned manner.

N,N'-dimethylperylene-3,4,9,10-tetracarboxylic acid diimide was used as the charge carrier generating substance, and same was vacuum vapordeposited on an aluminum plate under the conditions: degree of vacuum $10^{-5}$, vapordeposition source temperature 300° C. and vapordeposition time 3 minutes to thereby form the charge carrier generating layer. In succession, a solution comprising 5 parts by weight of 2,5-bis(4-diethylaminophenyl)1,3,4-oxadiazole, 5 parts by weight of polyester resin (Polyester Adhesive 49000, produced by Du Pont Co.) and 90 parts by weight of tetrahydrofuran was applied on the resulting charge carrier generating layer, and dried at 120° C. for 10 minutes to thereby form the charge transfer layer having a thickness of about 10 μm. Thus, Comparative element No. 1 was prepared.

Comparative Example 2

The mutilayer type element disclosed in Japanese Patent Publication 42380/1980, wherein Chloro Dian Blue was incorporated in the charge carrier generating layer and a hydrazon compound was incorporated in the charge transfer layer, was prepared in the undermentioned manner.

A solution comprising 25 parts by weight of Chloro Dian Blue, 1240 parts by weight of ethylene diamine, 990 parts by weight of n-butylamine and 2740 parts by weight of tetrahydrofuran was applied on the aluminum face of an aluminum-vapordeposited polyester base with a 25μ wet gap by means of a doctor blade and dried to thereby form the charge carrier generating layer. In succession, a solution comprising 10 parts by weight of 4-diethylaminobenzaldehyde 1,1-diphenylhydrazone, 10 parts by weight of polycarbonate resin (the same as the resin employed in Example 1) and 80 parts by weight of tetrahydrofuran was applied on the thus formed charge carrier generating layer by means of a doctor blade and dried to thereby form the charge transfer layer having a thickness of about 18μ. Thus, Comparative element No. 2 was prepared.

Comparative Example 3

The multilayer type element disclosed in Japanese Laid Open Patent Application 84943/1980, wherein a distyrylbenzene type disazo compound was incorporated in the charge carrier generating layer and a hydrazone compound was incorporated in the charge transfer layer, was prepared in the undermentioned manner.

20 parts by weight of 4',4''-bis[2-hydroxy-3-(2,4-dimethylphenylcarbamoyl)-1-naphthylazo]-1,4-distyrylbenzene, 3 parts by weight of polyvinylbutyral (Denka Butyral #4000-1, produced by Tokyo Denki Kagaku K.K.), 7 parts by weight of polymethyl methacrylate (DIANAL BR-80, produced by Mitsubishi Rayon K.K.) and 300 parts by weight of tetrahydrofuran were ball-milled for 3 hours to thereby obtain a dispersion. This dispersion was diluted with 2700 parts by weight of tetrahydrofuran. Thereafter, this dispersion was applied on the aluminum face of an aluminum-vapordeposited polyester base (electrically conductive substrate) by means of a doctor blade and dried to thereby form an about 0.3 μ-thick charge carrier generating layer. In succession, a solution comprising 10 parts by weight of 1-methyl-1-phenylhydrazone, 10 parts by weight of polycarbonate resin (the same resin as employed in Example 1) and 80 parts by weight of tetrahydrofuran was applied on said charge carrier generating layer and dried to thereby form an about 13 μ-thick charge transfer layer. Thus, Comparative multilayer type element No. 3 was prepared.

For the purpose of measuring the visible light wavelengths of these comparative elements No. 1 to 3 and the elements No. 11, 19, 26 and 41 of the present invention, said elements were subjected to spectral sensitivity measurement in accordance with the following procedure.

First, each element was charged by corona discharge in the dark so that its surface potential may become more than −800 V, and then subjected to dark decay until the surface potential becomes −800 V. When the surface potential became −800 V, the element was exposed to a monochromatic spectrum obtained by means of a monochrometer, its intensity of illumination on the element being 1 $\mu W/cm^2$. And, the time required until the surface potential decayed to −400 V was found out, and the half decay exposure amount ($\mu$W.sec/$cm^2$) was calculated therefrom. On the other hand, the potential difference to be obtained actually by the exposure was found out by subtracting the dark decayed potential portion from the apparent potential difference 400 V to be obtained by the exposure. Then, the light decay speed (Volt.$cm^2$.$\mu W^{-1}$.$sec^{-1}$) was calculated from the actual potential difference and half decay exposure amount and named sensitivity. The thus obtained results were shown in FIG. 16 to FIG. 20.

Figure 16:
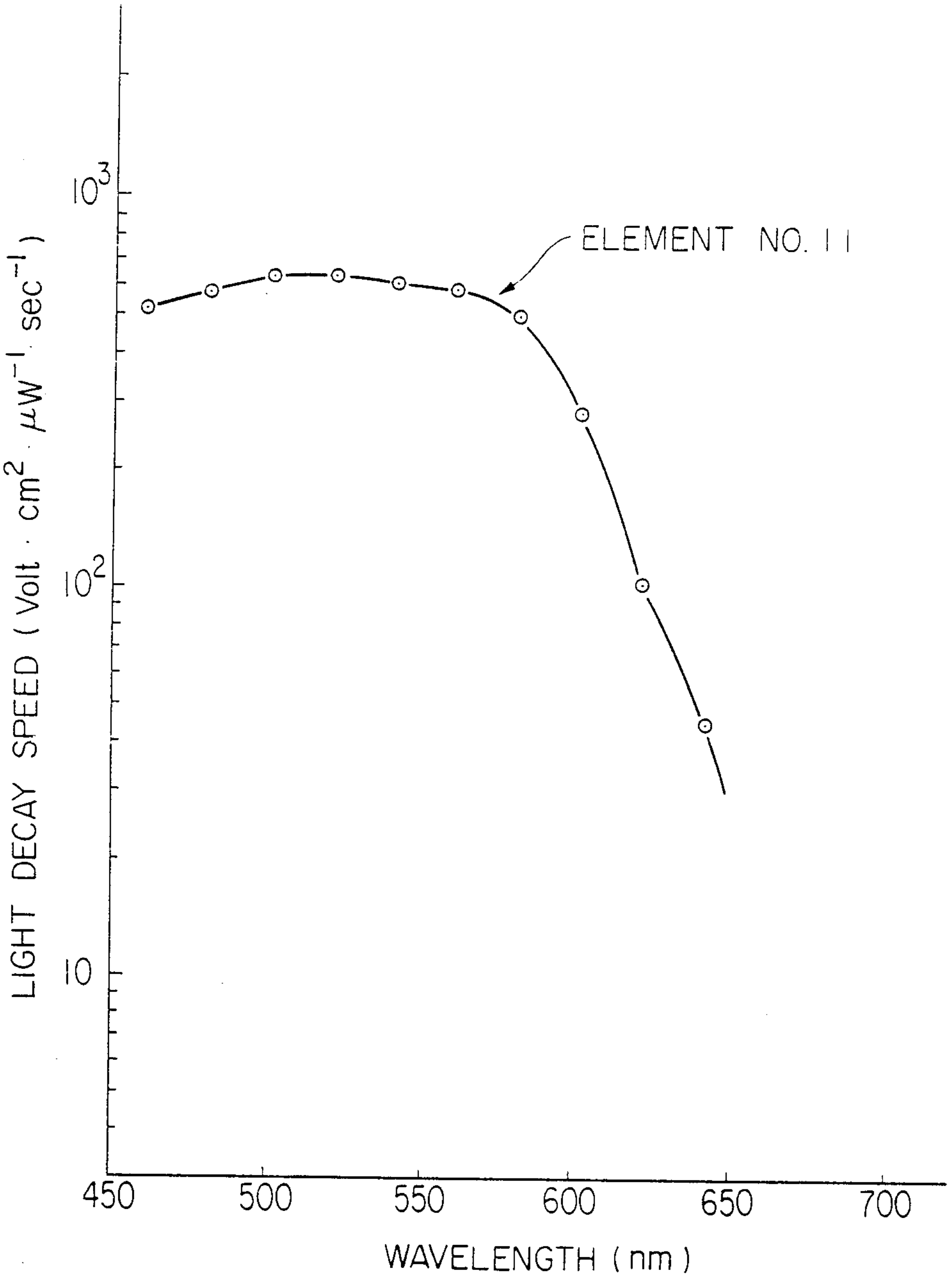
FIGS. 16 to 20 are graphs illustrating spectral sensitivity characteristics of the element of the present invention and the comparative elements.
Figure 17:
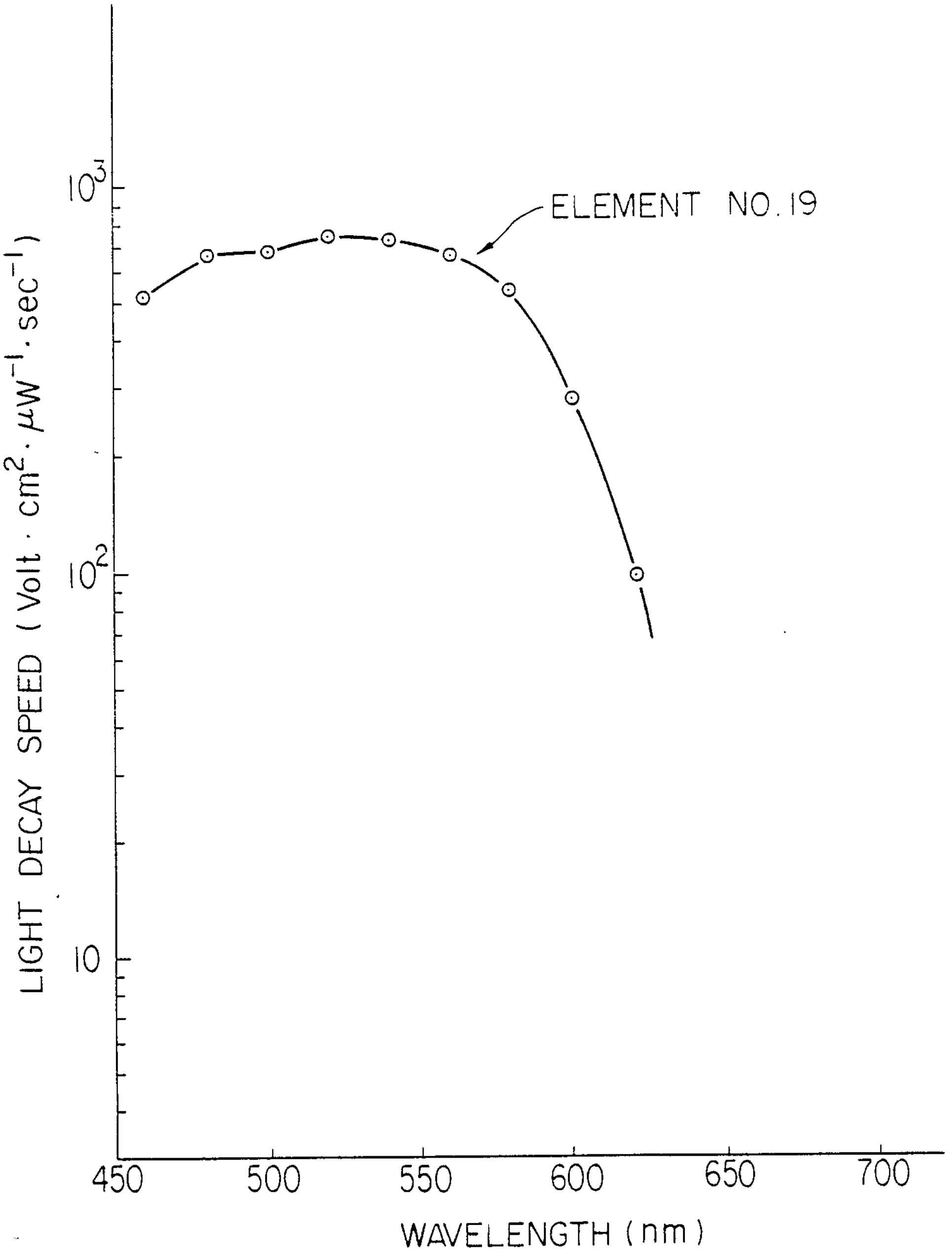
Figure 18:
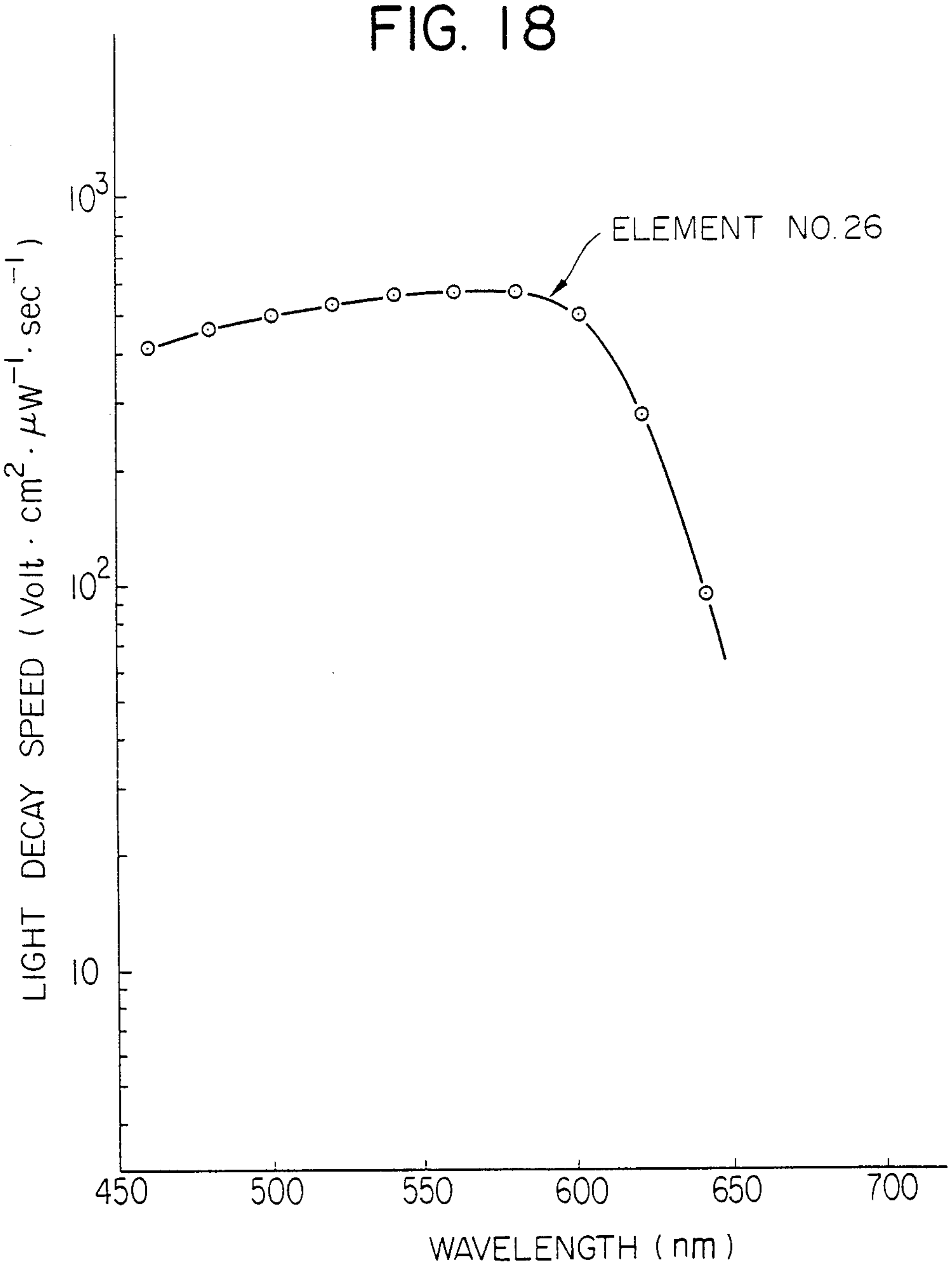
Figure 19:
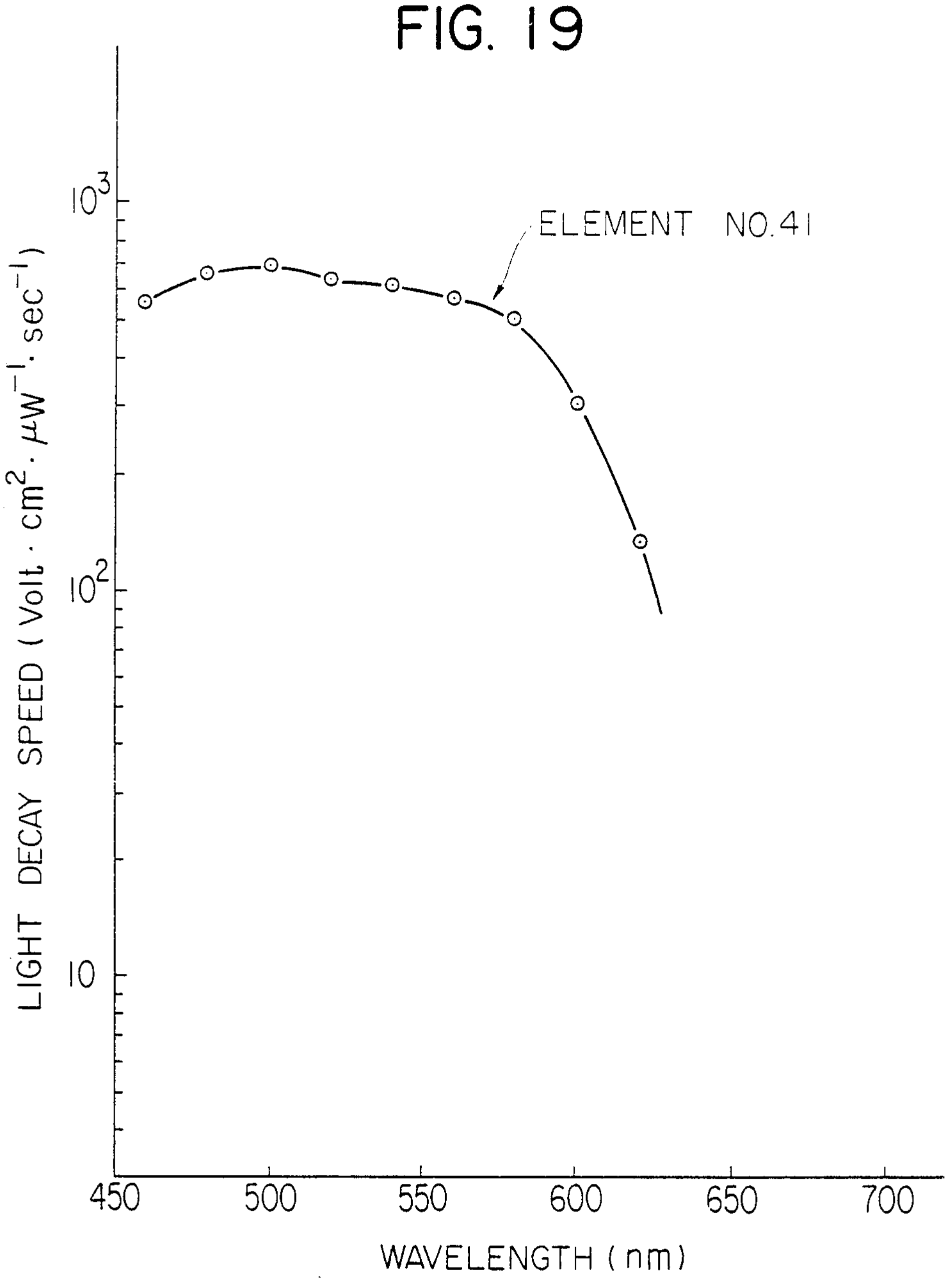
Figure 20:
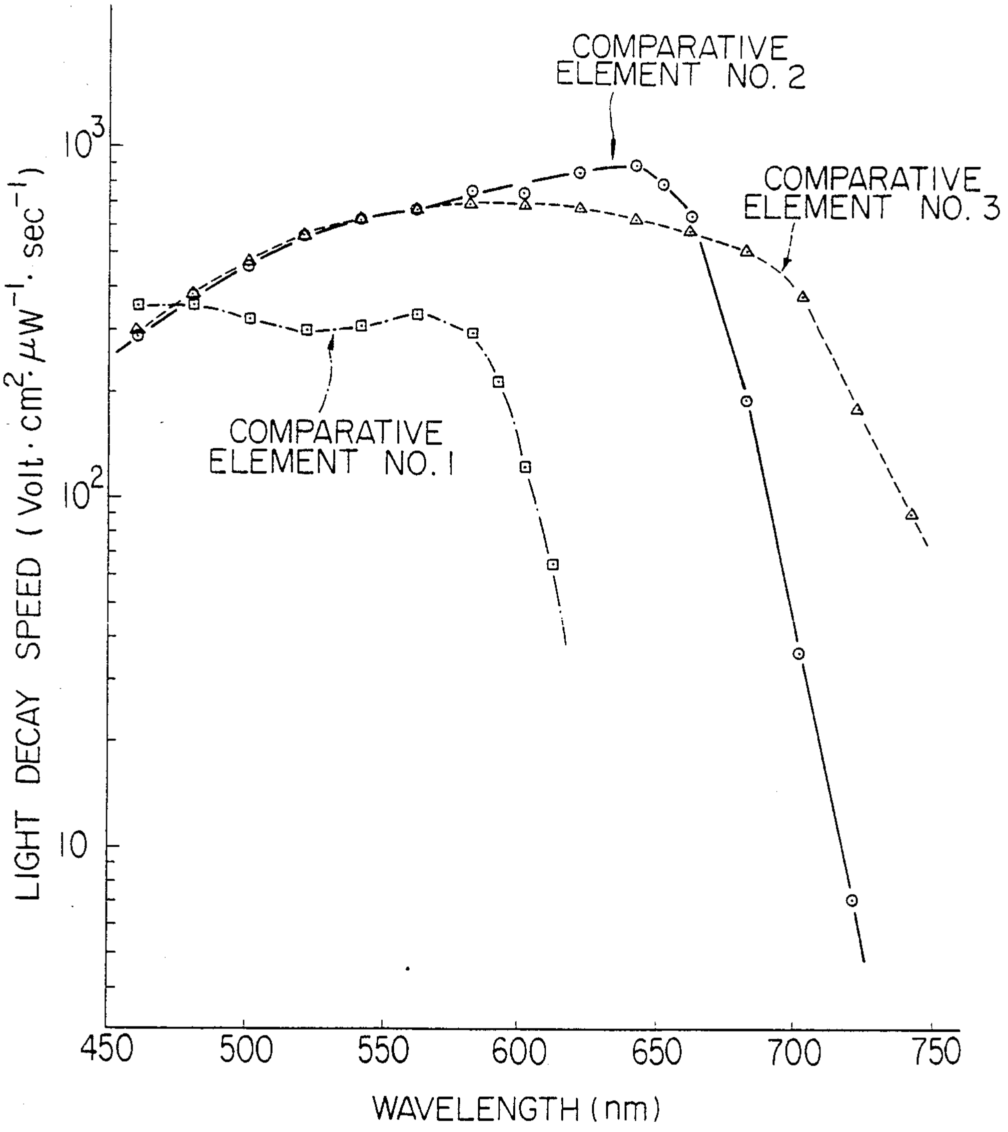

FIG. 16: Element No. 11
FIG. 17: Element No. 19
FIG. 18: Element No. 26
FIG. 19: Element No. 41

FIG. 20

⊡: Comparative element No. 1
⊙: Comparative element No. 2
Δ: Comparative element No. 3

Comparative Examples 4 and 5

For comparisons' sake, Comparative elements No. 4 and No. 5 were prepared respectively by repeating the exactly same procedure as employed in the preparation of the above element of the present invention except that the disazo compound of the present invention was replaced by (1) 4,4'-bis(2-hydroxy-3-phenylcarbamoyl-1-naphthylazo)-3,3'-dichlorodiphenyl (Chloro Dian Blue) coming under the benzidine type disazo compounds disclosed in the above mentioned Japanese Laid Open Patent Applications 37543/1970 and 55643/1977, and (2) 4,4'-bis(2-hydroxy-3-phenylcarbamoyl-1-naphthylazo) stilbene coming under the stilbene type disazo compounds in Japanese Laid Open Patent Application 8832/1977 respectively.

The thus prepared comparative elements No. 4 and No. 5 together with the element No. 19 according to the present invention were subjected to electrostatic characteristic measurement by means of a commercially available electrostatic copying paper tester (SP-428 TYPE, produced by Kawaguchi Electro Works). In more detail, said elements were first subjected to −6 KV corona discharge for 20 seconds and charged negatively to thereby measure the surface potential at that time and find out Vdo (V). Then, the said elements were left standing in the dark for 20 seconds for dark decay purpose to thereby measure the surface potential at that time and find out Vdo (V). In succession, the elements were exposed to radiation of light from a tungsten lamp so that the intensity of illumination on their surfaces may be 20 lux. And, the time required until the surface potential was reduced to ½ of Vpo was found out and named the exposure amount E½ (lux.sec). Likewise, the time required until the surface potential Vpo was reduced to 1/5 and 1/10 were found out respectively, and then the exposure amount E1/5 (lux.sec) and the surface amount E1/10 (lux.sec) were calculated therefrom respectively. The obtained results were shown in Table 17.

TABLE 17

| Element | Vdo (V) | Vpo (V) | Vpo/ Vdo | E½ (lux · sec) | E1/5 (lux · sec) | E1/10 (lux · sec) |
|---|---|---|---|---|---|---|
| Our element No. 19 | −1226 | −971 | .792 | 3.9 | 6.8 | 8.2 |
| Comparative element No. 4 | −940 | −693 | .738 | 5.9 | 12.3 | 16.7 |
| Comparative element No. 5 | −1817 | −1501 | .826 | 19.3 | 51.0 | 75.0 |

It can be seen from the above results that the element using the disazo compound according to the present invention is high in sensitivity and its visible light wavelengths cover the range of about 460 to 600 nm. Accordingly, the element according to the present invention is superior in the reproductivity of red image and so can dispense with a red filter when actually set in a copying machine.

Further, as the preparation of the electrophotographic element according to the present can dispense with the necessity of employing the vacuum vapor-deposition as used in the preparation of said comparative element No. 1 or using the organic amine as used in the preparation of said comparative element No. 2, the element of the present invention should be said profitable from the viewpoint of production.

Still further, the elements Nos. 11, 19, 26 and 41 of the present invention were each subjected to 10,000 times repeated reproduction by means of a copying machine RICOPY P-500 manufactured by RICOH COMPANY, LTD. As the result, each element was found to produce a clear-cut image. It may be understood therefrom that the elements of the present invention are extremely superior in durability.

Still more further, it is to be noted that the disazo compound according to the present invention is useful either as a charge carrier generating substance for the electrophotographic element comprising a monolayer type photosensitive layer formed by dispersing a charge carrier generating substance and a charge transfer substance in a resin or as a photoconductive substance for the electrophotographic element comprising a photosensitive layer formed by dispersing a photoconductive substance in a resin.

What is claimed is:

1. A disazo compound having the formula:

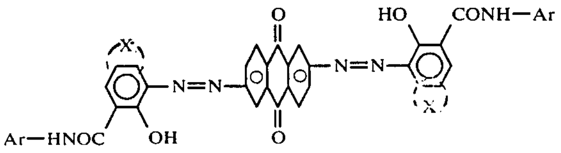

wherein X is selected from the group consisting of benzo, naphtho, indolo, carbazolo, benzofurano and halogen-substituted derivatives thereof, and Ar is selected from the group consisting of phenyl, naphthyl, dibenzofuranyl, carbazolyl, and substituted derivatives thereof, wherein the substituent on said substituted derivative is one or more members selected from the group consisting of lower alkyl, lower alkoxy, halogen, trifluoromethyl, cyano, nitro, carboxyl, —COOR wherein R is lower alkyl, di(lower alkyl)amino and $—SO_3Na$.

2. A disazo compound as claimed in claim 1 wherein X is unsubstituted benzo, halogen substituted benzo, naphtho, indolo, carbazolo or benzofurano, and Ar is unsubstituted phenyl, phenyl substituted with alkyl, alkoxy, halogen, trifluoromethyl, cyano, nitro, dialkylamino, carboxyl, $—COOC_2H_5$ or $—SO_3Na$, naphthyl, dibenzofuranyl or carbazolyl.

3. A disazo compound as claimed in claim 1 wherein X is unsubstituted benzo and Ar is m-chlorophenyl.

4. A disazo compound as claimed in claim 1 wherein X is unsubstituted benzo and Ar is p-chlorophenyl.

5. A disazo compound as claimed in claim 1 wherein X is unsubstituted benzo and Ar is m-bromophenyl.

6. A disazo compound as claimed in claim 1 wherein X is unsubstituted benzo and Ar is p-bromophenyl.

7. A disazo compound as claimed in claim 1 wherein X is unsubstituted benzo and Ar is m-trifluoromethylphenyl.

8. A disazo compound as claimed in claim 1 wherein X is unsubstituted benzo and Ar is p-trifluoromethylphenyl.

9. A disazo compound as claimed in claim 1 wherein X is unsubstituted benzo and Ar is m-cyanophenyl.

10. A disazo compound as claimed in claim 1 wherein X is unsubstituted benzo and Ar is p-cyanophenyl.

11. A disazo compound as claimed in claim 1 wherein X is unsubstituted benzo and Ar is m-nitrophenyl.

12. A disazo compound as claimed in claim 1 wherein X is unsubstituted benzo and Ar is p-nitrophenyl.

13. A disazo compound as claimed in claim 1 wherein X is unsubstituted benzo and Ar is 2,5-dichlorophenyl.

14. A disazo compound as claimed in claim 1 wherein X is unsubstituted benzo and Ar is 2-methyl-5-chlorophenyl.

15. A disazo compound as claimed in claim 1 wherein X is unsubstituted benzo and Ar is 2-methyl-4-chlorophenyl.

16. A disazo compound as claimed in claim 1 wherein

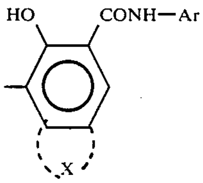

is

-continued

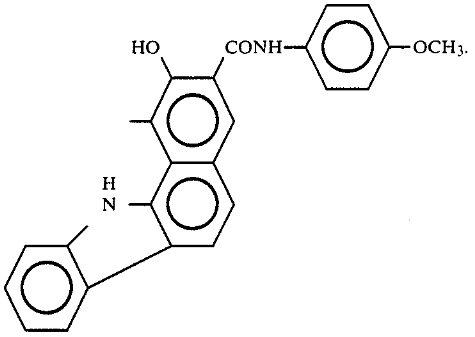

17. A disazo compound as claimed in claim 1 wherein X is unsubstituted benzo and Ar is o-methoxyphenyl, m-methoxyphenyl, p-methoxyphenyl, o-methylphenyl, m-methylphenyl, p-methylphenyl, phenyl, o-chlorophenyl, o-bromophenyl, o-cyanophenyl, o-trifluoromethylphenyl, o-nitrophenyl, 2-nitro-4-methylphenyl, 2,5-dimethoxy-4-chlorophenyl or 2,4-dimethoxy-5-chlorophenyl.

18. A disazo compound as claimed in claim 1 wherein

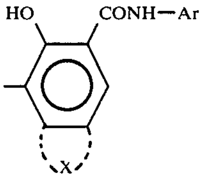

is

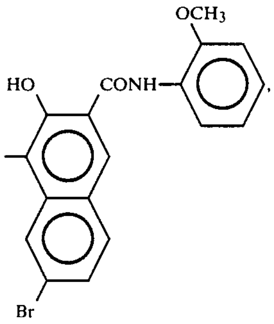

,

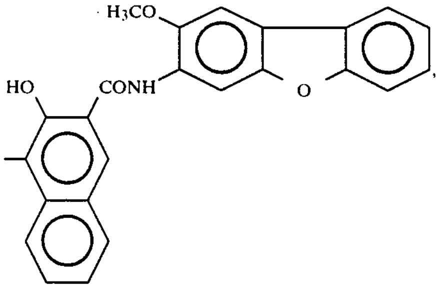

,

-continued
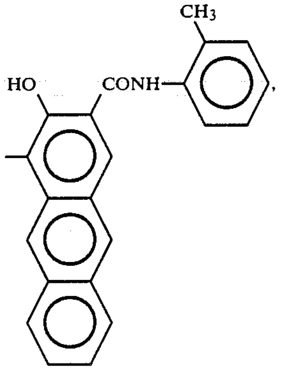
-continued
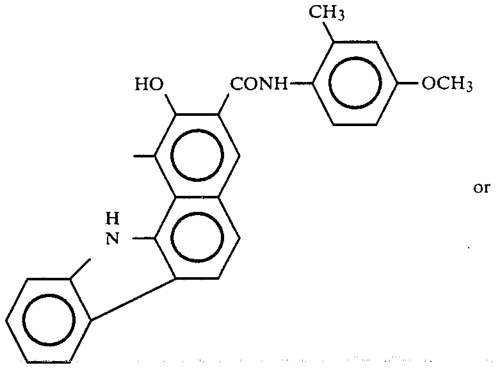
or
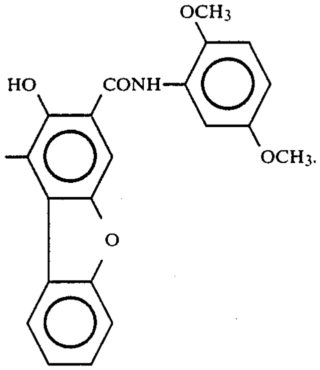
* * * * *